United States Patent [19]

Chu et al.

[11] Patent Number: 5,702,059

[45] Date of Patent: Dec. 30, 1997

[54] EXTENDED WORKING RANGE DATAFORM READER INCLUDING FUZZY LOGIC IMAGE CONTROL CIRCUITRY

[75] Inventors: John B. Chu; Paul P. Ju; Ynjiun P. Wang, all of Fort Myers, Fla.

[73] Assignee: Meta Holding Corp., Fort Myers, Fla.

[21] Appl. No.: 544,618

[22] Filed: Oct. 18, 1995

Related U.S. Application Data

[63] Continuation-in-part of Ser. No. 507,607, Jul. 25, 1995, Ser. No. 494,435, Jun. 26, 1995, Ser. No. 332,592, Oct. 31, 1994, and Ser. No. 280,489, Jul. 16, 1994, Pat. No. 5,572,006.

[51] Int. Cl.$^6$ ................................................. G06K 07/30
[52] U.S. Cl. ........................................ 235/462; 259/454
[58] Field of Search .................................. 235/462, 472, 235/465, 468, 470; 395/980, 3

[56] References Cited

U.S. PATENT DOCUMENTS

| | | | |
|---|---|---|---|
| 4,210,802 | 7/1980 | Sakai | 235/462 |
| 4,409,470 | 10/1983 | Shepard et al. | 235/462 |
| 4,734,566 | 3/1988 | Senda et al. | 235/462 |
| 4,766,300 | 8/1988 | Chadima, Jr. et al. | 235/462 |
| 4,835,615 | 5/1989 | Taniguchi et al. | 235/462 |
| 4,877,949 | 10/1989 | Danielson et al. | 235/472 X |
| 4,952,966 | 8/1990 | Ishida et al. | 235/462 |
| 4,962,432 | 10/1990 | Ohtsuka et al. | 235/462 |
| 4,996,413 | 2/1991 | McDaniel et al. | 235/462 |
| 5,010,580 | 4/1991 | Vincent et al. | 235/462 |
| 5,019,699 | 5/1991 | Koenck | 229/462 |
| 5,025,319 | 6/1991 | Mutoh et al. | 235/462 |
| 5,080,456 | 1/1992 | Katz et al. | 235/462 |
| 5,083,150 | 1/1992 | Nagasaki et al. | 395/900 X |
| 5,128,769 | 7/1992 | Arai et al. | 395/900 |
| 5,130,520 | 7/1992 | Shepard et al. | 235/462 |
| 5,131,053 | 7/1992 | Bernzott et al. | 235/462 |
| 5,168,149 | 12/1992 | Dvorkis et al. | 235/462 |
| 5,184,005 | 2/1993 | Ukai et al. | 235/462 |
| 5,187,356 | 2/1993 | Chadima, Jr. et al. | 235/462 |
| 5,200,597 | 4/1993 | Eastman et al. | 235/462 |
| 5,210,398 | 5/1993 | Metlitsky | 235/462 |
| 5,235,167 | 8/1993 | Dvorkis et al. | 235/462 |
| 5,237,365 | 8/1993 | Miyazawa | 395/900 X |
| 5,243,666 | 9/1993 | Hasegawa et al. | 395/900 X |
| 5,245,445 | 9/1993 | Fujisawa | 395/900 X |
| 5,258,604 | 11/1993 | Behrens et al. | 235/462 |
| 5,262,871 | 11/1993 | Wilder et al. | 235/462 |
| 5,272,538 | 12/1993 | Homma et al. | 235/462 |
| 5,276,315 | 1/1994 | Surka | 235/462 |
| 5,278,397 | 1/1994 | Barken et al. | 235/462 |

(List continued on next page.)

FOREIGN PATENT DOCUMENTS

| | | |
|---|---|---|
| 60-129891 | 7/1985 | Japan . |
| 63-67692 | 3/1988 | Japan . |
| 0083886 | 4/1990 | Japan . |
| 0262287 | 10/1990 | Japan . |
| 3-198175 | 8/1991 | Japan . |
| 5-242287 | 9/1993 | Japan . |
| 406162247 | 6/1994 | Japan . |

OTHER PUBLICATIONS

PCT International Search Report dated Sep. 18, 1996 (two pages).
PCT International Search Report date Nov. 7, 1996 (one page).

Primary Examiner—Donald T. Hajec
Assistant Examiner—Thien Minh Le
Attorney, Agent, or Firm—Watts, Hoffmann, Fisher & Heinke Co.

[57] ABSTRACT

A portable data collection system is disclosed. The system includes a dataform reader module having a board camera electrically coupled to a control and decoder board in an open loop feedback configuration. The control and decoder board includes fuzzy logic image control circuitry which analyzes a captured frame of a video image including a dataform produced by the board camera. Based on the analysis of the captured frame, the fuzzy logic image control circuitry generates control signals to adjust operating parameters of the board camera such that an image suitable for decoding is produced.

20 Claims, 11 Drawing Sheets

U.S. PATENT DOCUMENTS

| | | | |
|---|---|---|---|
| 5,291,009 | 3/1994 | Roustaei | 235/462 |
| 5,293,238 | 3/1994 | Nakano et al. | 235/462 |
| 5,296,690 | 3/1994 | Chandler et al. | 235/462 |
| 5,308,960 | 5/1994 | Smith et al. | 235/462 |
| 5,308,966 | 5/1994 | Danielson | 235/462 |
| 5,309,243 | 5/1994 | Tsai | 235/462 |
| 5,314,631 | 5/1994 | Katoh et al. | 235/462 |
| 5,315,095 | 5/1994 | Maron et al. | 235/462 |
| 5,319,181 | 6/1994 | Shellhammer et al. | 235/462 |
| 5,331,143 | 7/1994 | Maron et al. | 235/462 |
| 5,332,892 | 7/1994 | Li et al. | 235/462 |
| 5,340,973 | 8/1994 | Knowles et al. | 235/462 |
| 5,345,266 | 9/1994 | Denyer | 235/462 |
| 5,349,172 | 9/1994 | Roustaei | 235/462 |
| 5,352,884 | 10/1994 | Petrick et al. | 235/462 |
| 5,354,977 | 10/1994 | Roustaei | 235/462 |
| 5,359,185 | 10/1994 | Hason | 235/462 |
| 5,386,271 | 1/1995 | Maekawa et al. | 395/900 X |
| 5,401,949 | 3/1995 | Ziemacki et al. | 235/463 |
| 5,406,063 | 4/1995 | Jelen | 235/462 |
| 5,408,084 | 4/1995 | Brandorff et al. | 235/462 |
| 5,414,251 | 5/1995 | Durbin | 235/462 |
| 5,418,357 | 5/1995 | Inoue et al. | 235/462 |
| 5,420,635 | 5/1995 | Konishi et al. | 235/462 |
| 5,420,943 | 5/1995 | Mak | 235/462 |
| 5,448,293 | 9/1995 | Kogane et al. | 235/462 |
| 5,468,947 | 11/1995 | Danielson et al. | 235/462 |
| 5,468,950 | 11/1995 | Hanson | 235/462 |
| 5,478,997 | 12/1995 | Bridgelall et al. | 235/462 |
| 5,484,994 | 1/1996 | Roustaei | 235/462 |
| 5,486,688 | 1/1996 | Iima et al. | 235/462 |
| 5,496,992 | 3/1996 | Madan et al. | 235/462 |
| 5,504,316 | 4/1996 | Bridgall et al. | 235/462 |
| 5,521,366 | 5/1996 | Wang et al. | 235/454 |
| 5,559,555 | 9/1996 | Shimzu et al. | 235/462 |
| 5,576,523 | 11/1996 | Koewcki et al. | 235/472 |

| INDEX | EP (ms) | GAIN | REF H | REF L |
|---|---|---|---|---|
| 0 | 20 | MAX | 40 | 10 |
| 1 | 20 | ↑ | 45 | 10 |
| 2 | 20 |  | 50 | 10 |
| 3 | 20 |  | 55 | 10 |
| 4 | 20 |  | 60 | 10 |
| 5 | 20 |  | 65 | 10 |
| 6 | 20 |  | 70 | 10 |
| 7 | 20 |  | 75 | 10 |
| 8 | 20 |  | 80 | 10 |
| 9 | 10 |  | 50 | 10 |
| 10 | 10 |  | 55 | 10 |
| 11 | 10 |  | 60 | 10 |
| 12 | 10 |  | 65 | 10 |
| 13 | 10 |  | 70 | 10 |
| 14 | 10 |  | 75 | 10 |
| 15 | 10 |  | 80 | 10 |
| 16 | 4 |  | 50 | 10 |
| 17 | 4 |  | 55 | 10 |
| 18 | 4 |  | 60 | 10 |
| 19 | 4 |  | 65 | 10 |
| 20 | 4 |  | 70 | 10 |
| 21 | 4 |  | 75 | 10 |
| 22 | 4 |  | 80 | 10 |
| 23 | 2 |  | 50 | 10 |
| 24 | 2 |  | 55 | 10 |
| 25 | 2 |  | 60 | 10 |
| 26 | 2 |  | 65 | 10 |
| 27 | 2 |  | 70 | 10 |
| 28 | 2 |  | 75 | 10 |
| 29 | 2 |  | 80 | 10 |
| 30 | 1 |  | 50 | 10 |
| 31 | 1 |  | 55 | 10 |
| 32 | 1 |  | 60 | 10 |
| 33 | 1 |  | 65 | 10 |
| 34 | 1 |  | 70 | 10 |
| 35 | 1 |  | 75 | 10 |
| 36 | 1 |  | 80 | 10 |
| 37 | 0.5 |  | 50 | 10 |
| 38 | 0.5 |  | 55 | 10 |
| 39 | 0.5 |  | 60 | 10 |
| 40 | 0.5 |  | 65 | 10 |
| 41 | 0.5 |  | 70 | 10 |
| 42 | 0.5 |  | 75 | 10 |
| 43 | 0.5 |  | 80 | 10 |
| 44 | 0.25 |  | 50 | 10 |
| 45 | 0.25 |  | 55 | 10 |
| 46 | 0.25 |  | 60 | 10 |
| 47 | 0.25 |  | 65 | 10 |
| 48 | 0.25 |  | 70 | 10 |
| 49 | 0.25 |  | 75 | 10 |
| 50 | 0.25 |  | 80 | 10 |
| 51 | 0.01 |  | 50 | 10 |
| 52 | 0.01 |  | 55 | 10 |
| 53 | 0.01 |  | 60 | 10 |
| 54 | 0.01 |  | 65 | 10 |
| 55 | 0.01 | ↓ | 70 | 10 |
| 56 | 0.01 |  | 75 | 10 |
| 57 | 0.01 | MAX | 80 | 10 |

Fig.4

EXTENDED WORKING RANGE DATAFORM READER INCLUDING FUZZY LOGIC IMAGE CONTROL CIRCUITRY

CROSS REFERENCE TO RELATED APPLICATIONS

This application is a continuation-in-part of application Ser. No. 08/507,607, filed Jul. 25, 1995 and application Ser. No. 08/494,435, filed Jun. 26, 1995 and application Ser. No. 08/332,592, filed Oct. 31, 1994 and application Ser. No. 08/280,489 filed Jul. 16, 1994, now U.S. Pat. No. 5,572,006 each of which is incorporated herein in their respective entireties.

TECHNICAL FIELD

This invention relates to a dataform reader and method for reading dataforms including 1D and 2D bar codes and matrix codes and, more particularly, to a dataform reader and method for reading dataforms including a dataform reader module utilizing fuzzy logic image control circuitry to reduce the period of time required to adjust exposure control and signal processing parameters to achieve an acceptable gain adjusted and properly exposed composite video image suitable for decoding.

BACKGROUND OF THE INVENTION

A. Background of Dataforms

The application and use of bar codes and matrix codes are well known and growing. Bar codes and matrix codes are forms of "dataforms", which for present purposes are defined to include all arrangements whereby data is fixed in some form of machine readable copy. Thus, dataforms include one dimensional (1D) and two dimensional (2D) bar codes (e.g., UPC, C1 28, PDF417, etc.), matrix codes (e.g. MaxiCode, Data Matrix, Code 1, etc.) and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing as a graphic image can be acquired by use of a charge-coupled device (CCD) reader, a laser scanner or other suitable device which is capable of distinguishing between different reflective values of light reflected data cells and synchronizing the data cell format for a particular dataform. Thus, for example, a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area. In other applications, such as laser engraving on silicon wafers, illumination may result in a dark on light relationship in one orientation and a light on dark relationship in a different orientation. In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

B. Background of Dataform Readers

Current art portable terminals with integrated laser bar code scanner modules or 1D CCD bar code reader modules are not well suited for reading 2D bar code dataforms. Laser bar code scanners operate by projecting a narrow laser beam of light which forms an intensely illuminated spot on the bar code. Oscillating mirrors continually redirect the laser beam so that the spot moves in a sweeping pattern or a raster pattern. Generally a sweeping pattern refers to oscillation of the beam along the horizontal axis without any vertical oscillation. A raster pattern refers to a rapid oscillation along the horizontal axis and a slower oscillation along the vertical axis so that raster pattern appears to be a sweeping pattern moving up and down. A photodetector collects illumination from the entire target area. When the moving, or flying spot is incident on a highly reflective portion of the bar code, such as a white background, light reflected from the spot is incident on the photosensor. When the flying spot is incident on a less reflective portion of the bar code, such as a black bar, less light is reflected towards the photodetector.

A laser scanner does not have an internal synchronization mechanism. The laser scanner calculates the laser spot's relative horizontal position based on known self-synchronizing patters in the 1D bar code. This can be referred to as a code self-synchronizing system. A raster pattern laser scanner can read 2D stacked bar code such as PDF-417 because PDF-417 has particular row indicator patterns which are recognizable and used by the scanner for vertical synchronization. This system has very little rotation angle tolerance, because the scanner cannot recognize a row indicator pattern or other codework pattern unless the spot sweeps across the entire pattern.

A laser scanner cannot read 2D matrix codes such as the MaxiCode and the Datamatrix code because such codes do not have row indicator patterns for vertical synchronization.

A 1D CCD reader operates by imaging a long and thin target area onto a 1D photodetector array rather than scanning a spot of illumination across the bar code symbol. If the reader is positioned relative to a 1D bar code so that the imaged target area falls relatively across the bar code, then the bar code can then be decoded based on the run-length sequences of gray scale values derived from the pixels on which each bar and space of the code is imaged. Similar to the laser scanner, the 1D CCD has no vertical synchronization and must rely on row indicator patterns for vertical synchronization.

More recently, the CCD reader concept has been extended to 2D CCD readers such as the TEC contact reader made by Tokyo Electric Company. A 2D CCD reader images a target area onto a 2D array of photodetectors or photosensors. Such a device is capable of reading matrix codes because the 2D pixel array provides both horizontal and vertical synchronization. This reader is too large and bulky for practical use in a portable terminal. Furthermore, the device consumes too much power for battery powered portable use.

Current 2D CCD readers have an image capture system that includes a board camera which continually produce a composite video signal representative of the target area. When a reading session begins, a portion of the signal is selected for decoding. Because the board camera continually generates a video signal, it consumes approximately 1–2 watts of power. Such consumption would drain typical batteries in less than 1 hour of operation.

Current state of the art image capture configurations do not provide for the board camera to be shut down between reading sessions. Currently available board cameras require 600 milliseconds (ms) latency time to generate a gain corrected and properly exposed composite video signal after power up, that is, to reach an equilibrium condition. The latency time includes the time required to synchronize the readout of the photosensors plus the time required to adjust the gain control and exposure period through closed loop analog feed back circuitry. The latter time period comprises most of the latency time period. Therefore, if each read session required powering up the board camera, the read session would necessarily be longer than 600 ms. Because of customer expectations for a rapid response time, it is highly desirable that a time period of the entire read session should be under 300 ms. Therefore, with present devices, the board camera cannot be shut down between dataform reading sessions.

Current exposure control systems use independent analog integration circuits which receive the analog video signal from the photosensor array and generate independent voltage signals for controlling gain, exposure period and a reference voltage. Closed loop analog systems provide a linear adjustment to the exposure parameters (gain, exposure period and reference voltage) which is particularly desirable to eliminate any abrupt changes in the composite video signal. However, such closed loop analog systems are not desirable in a dataform reader wherein rapid change in the video signal is desirable to achieve a decodeable image as quickly as possible.

Therefore, there is a need to have a 2D imaging based dataform reader module that can be powered down between dataform reading sessions. Necessarily, such a reader module will have a rapid response time, that is, a short latency time period between powering up and generation of a properly gain adjusted and exposed composite video image suitable for decoding. There is also a need for such a reader module to have low power consumption while powered up.

There is also a need for such a dataform reader module to include image control circuitry which rapidly adjusts an exposure period and a gain setting of a board camera to achieve a decodeable composite video image. Further, there is a need for such image control circuitry to produce high and low reference voltage values to be utilized in adjusting the gain and exposure period settings.

Furthermore, there is a need to have such image control circuitry provide linear adjustments to the gain and exposure period settings to avoid undesirable abrupt changes in the composite video signal.

There is also a need to have a portable data collection system which includes such a dataform reader module. It is desirable that such system be small, lightweight, have low power consumption and overcome other drawbacks of prior art devices.

SUMMARY OF THE INVENTION

In accordance with this invention, a portable CCD dataform reader module is provided having a size and shape comparable to current laser scan modules. The reader module of the present invention includes a control and decoding board electrically coupled to a camera assembly including a board camera. The control and decoding board includes fuzzy logic image control circuitry which is coupled to the board camera in an open loop feedback configuration.

The board camera produces a video image of a target area which includes a dataform. The video image is comprised of successive frames of the image. A frame is comprised of two interlaced fields. A field is generated by reading out the charges accumulated on a two dimensional array of photosensors. The exposure period of the board camera is less than the time required to read out the charges on the photosensor array. The board camera generates a "raw" analog voltage signal corresponding to the video image. The "raw" analog signal is amplified by board camera gain circuitry. The gain adjusted analog video signal is coupled to the fuzzy logic image control circuitry.

The image control circuitry analyzes the gain adjusted video signal and generates control signals which are coupled to the board camera to control the gain setting and the exposure period of the board camera such that the camera produces a video image suitable for decoding.

Because of the speed at which the fuzzy logic image control circuitry analyzes a captured frame of the video image and, if necessary, adjusts the gain and/or the exposure period of the board camera, the reader module of the present invention can rapidly adjust to changing illumination environments. Furthermore, the reader module of the present invention can rapidly adjust to a new illumination environment upon powering up the module. Because of the ability rapidly adjust the exposure parameters to illumination conditions, it is possible to turn the reader module off between dataform reading sessions. Turning the reader module off between reading sessions significantly reduces power consumption of the module compared to current CCD reader modules. As noted above, current CCD reader modules are characterized by an unacceptably long response time (600 ms) from powering up to attaining a video image suitable for decoding and, therefore, are not typically turned off between reading sessions. The reader module of the present invention, therefore, has an increased effective operational time between battery replacements and/or rechargings vis-a-vis current CCD reader modules which are maintained in a powered up condition.

The fuzzy logic image control circuitry of the present invention includes a fuzzy logic control unit, signal processing circuitry, a D/A converter and an A/D converter. The image control circuitry receives the gain adjusted video signal output by the board camera and captures a portion of the signal for a time period corresponding to one video image frame. The signal, along with a high voltage reference value and a low voltage reference value are input to the A/D converter. The A/D converter digitizes the gain adjusted video signal and converts the resulting digitized voltage signal into a series of gray scale values. The gray scale utilized by the fuzzy logic image control circuitry of the present invention has a range of 0 (black) to 255 (white).

The board camera includes a 752 by 582 photosensor array comprising 437,664 photosensors. Thus, the photosensors produce a video image comprising 437,664 pixels. The captured video image frame therefore comprises approximately 437,664 pixels of varying intensity or brightness in accordance with the captured video image. The portion of the gain adjusted video signal corresponding to the captured frame represents the pixel intensities associated with the frame. The signal is converted to a series of 437,664 corresponding gray scale values. The gray scale values are input to signal processing circuitry which generates three values based on the gray scale values. The three values are: an intensity value (I), a dynamic range maximum value (DRMAX) and a dynamic range minimum value (DRMIN). The I, DRMAX and DRMIN values are input to a fuzzy logic control unit. The fuzzy logic control unit utilizes three empirically derived membership function charts stored in memory and the values of I, DRMAX and DRMIN to calculate an index modification value.

The fuzzy logic control unit adds the calculated index modification value to a present index value to calculate a revised index value. The fuzzy logic control unit then accesses an empirically derived look up table stored in memory to ascertain the "correct" values for: a) a gain setting for the board camera; b) an exposure period for the board camera; c) a high reference voltage value; and d) a low reference voltage value based on the revised index value. The "correct" settings for the gain setting and the exposure period are values which have empirically been found to result in the board camera generating a video image that is acceptable for dataform decoding.

The fuzzy logic control unit compares the present index value and the revised index value. If the two index values are "close", that is, the difference between the values is within a predetermined range, then the captured video image frame is suitable for decoding and is subsequently decoded by decoding circuitry. If the two index values are not "close", the fuzzy logic control unit generates digital control signals which correspond to the "correct" settings for gain and exposure period. The digital control signals are converted to analog signals by the D/A converter and coupled to gain circuitry and exposure period circuitry of the board camera to adjust the gain and exposure period of the board camera to conform to the ascertained "correct" gain and exposure period settings. The predetermined "close" range varies by index value and is empirically determined.

Conceptually, if the differences between the present and revised index values is outside the predetermined range associated with the present index value, then the captured video image frame is not suitable for decoding and another frame will be captured and analyzed to determine if the newly captured frame is suitable for decoding. Prior to capturing a new frame, the fuzzy logic control unit generates control signals which are coupled to the board camera to adjust the gain setting and the exposure period in accord with the previously determined "correct" values. The analysis process is repeated with the newly captured video image frame. The analysis of the newly captured video image frame utilizes the "correct" high and low reference voltage values.

Also in accordance with this invention, the reader module includes a large F# optic assembly that provides a working range from about 2.5" to at least 8.5" in front of the reader while maintaining a broad field of view. The reader module is capable of capturing a high signal to noise ratio image in under 0.01 seconds thereby making the reader highly tolerant to user hand jitter. To accommodate the large F# optic and short exposure period, the reader module is provided with an efficient high intensity uniform illumination module.

The high intensity illumination module is secured to the front surface of the reader module housing to avoid the illumination loss problem and the internal reflection illumination noise problem associated with placing the illumination source behind a window within the reader module housing. The illumination module includes a printed circuit board assembly including a plurality of surface mount LEDs secured to the front side of a printed circuit board. The board is bonded into a cavity in a backside of a durable acrylic lens array. The lens array operates to direct uniform and intense illumination towards a target area in front of the reader module.

In the preferred embodiment, the illumination module has an aperture in the center and the reader module is positioned to gather light reflected from the target area through the aperture. This configuration assures illumination directed from the lens array of the reader module is aligned with the field of view of the reader module.

In one aspect of this invention, the reader module includes circuitry that emulates the output of a laser scan module making it retrofitable into dataform reading devices that include a laser scanner.

In another aspect of this invention, a data collection system is provided that includes the reader module of the present invention. The dataform reading system is intended for complete portable use and includes a spread spectrum radio which operates to couple the reader with a computer throughout an IEEE 802.11 compatible network. The spread spectrum radio can be used to transmit decoded dataform data, photographic image data in a compressed format, or compressed data files representing voice messages.

Also in accordance with this invention, a portable data collection system including the dataform reader module of the present invention additionally includes user interface devices such as a keyboard, display, touch panel, microphone and speaker which operate with various circuits to improve the functionality of the reader module.

For a better understanding of the invention, together with other and further objects, reference is made to the accompanying drawings and the scope of the invention will be pointed out in the accompanying claims.

BRIEF DESCRIPTION OF THE DRAWINGS

Preferred embodiments of the invention are described below with reference to the accompanying drawings, which are briefly described below.

FIG. 4 is an empirical look up take used to determine value for exposure period, gain, high reference voltage value and low reference voltage value based on a calculated index value;

DETAILED DESCRIPTION

Figure 1:
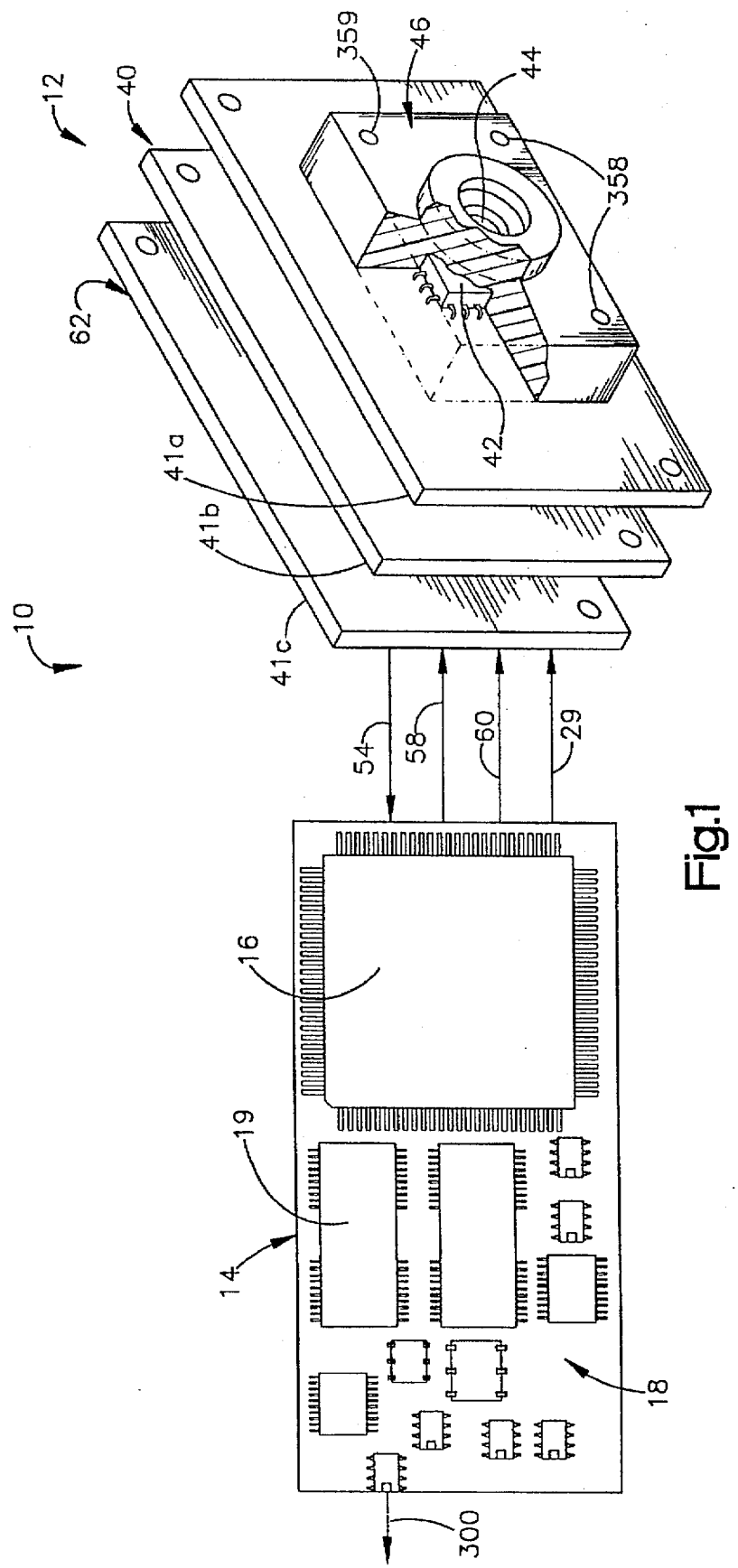
FIG. 1 is a perspective view of a dataform reader module of the present invention including a control and decoder board and a cut away view of a camera assembly.

Turning to the drawings, a dataform reader module of the present invention is shown generally at 10 in FIG. 1. The dataform reader module 10 includes a camera assembly 12 and a control and decoder board 14. The control and decoder board 14 includes a microprocessor 16 and fuzzy logic image control circuitry 18. The fuzzy logic image control circuitry 18 may be embodied in software resident in one or more RAM or ROM memory chips 19 mounted on the board 14 and operated by the microprocessor 16. Alternately, the image control circuitry 18 may comprise separate application-specific integrated circuitry (ASIC) mounted on the board.

Figure 2:
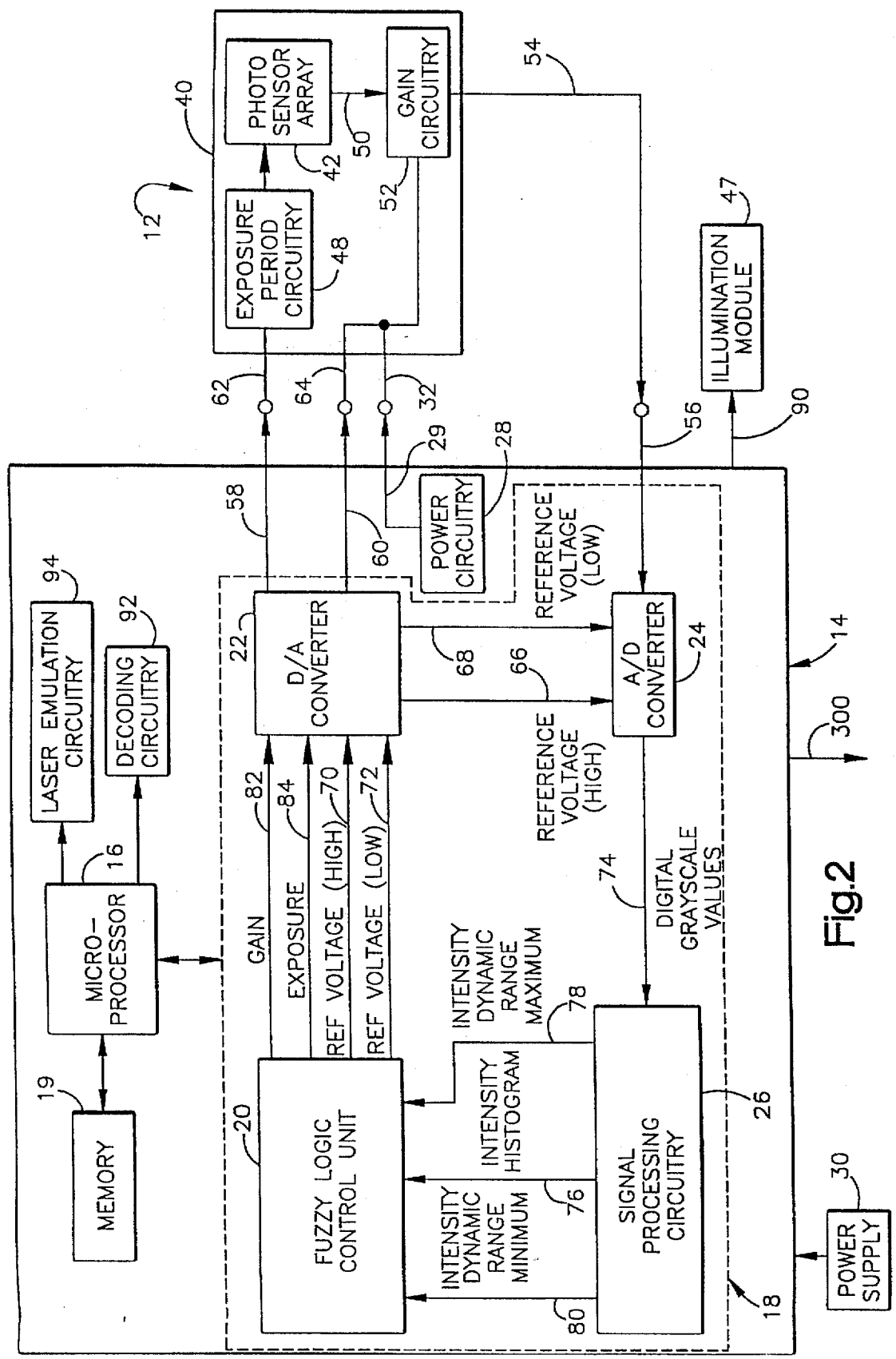
FIG. 2 is a block diagram of selected electronic components of the dataform reader module of FIG. 1.

As can best be seen schematically in FIG. 2, the image control circuitry 18 mounted on the control and decoder board 14 includes a fuzzy logic control unit 20, digital to analog conversion circuitry (D/A converter) 22, analog to digital conversion circuitry (A/D converter) 24 and signal processing circuitry 26. The board 14 also includes power circuitry 28. A power supply 30 supplies power to circuitry on the board 14. The power circuitry 28 includes a lead 29 which, in turn, is coupled to an input port 32 of the camera assembly 12 to provide power to the assembly.

Figure 6:
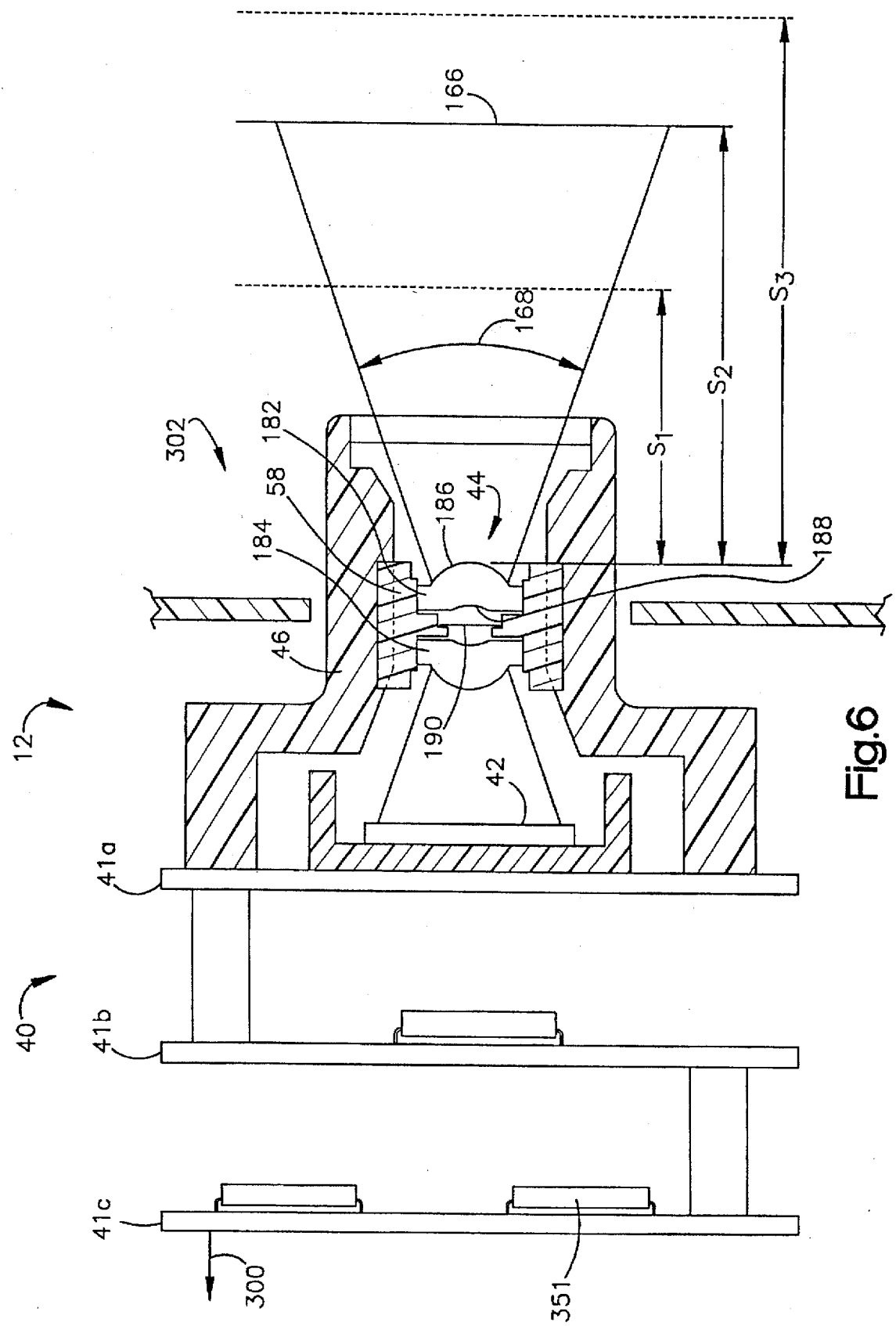
FIG. 6 is a diagrammatic top view of the dataform reader module of FIG. 1.

As can be seen in FIGS. 1 and 6, the camera assembly 12 includes a board camera 40 comprised of a spaced arrangement of three printed circuit boards 41a, 41b, 41c. Mounted on the top board 41a of the board camera 40 is a 2D photosensor array 42 and an optic assembly 44 for focusing an image of an object or target field 166 (FIG. 6) including a bar code dataform (not shown) onto the photosensor array. The photosensor array 42 includes an 752 by 582 array of photosensors. When the reader module 10 is powered up, the photosensor array 42 produces a video image comprising 437,664 pixels. The optic assembly 44 is supported in an annular shaped camera housing 46 which shrouds the photosensor array 42 to prevent ambient light from reaching the photosensors. The optic assembly 44 is spaced from the photosensor array 42 a distance corresponding to an image plane of the optic assembly.

Each of the photosensors of the photosensor array 42 stores a charge resulting from photons striking the photosensor during an exposure period. The exposure period is less than the time required to read out a field of the video image. Reading out the charges accumulated on each of the 437,664 photosensors in the photosensor array 42 constitutes a field of the video image. Two interlaced fields comprise one frame of the video image. The magnitude of a photosensor's charge at the end of an exposure period is proportional to the number of photons striking the photosensor. The photons striking the photosensors are associated with light reflected from the target or image area. The incident light striking the target field or area 166 is produced by an illumination module 47 (not shown in FIG. 1, but shown in FIGS. 7 and 8). The intensity or brightness of each pixel corresponds to its associated photosensor's charge.

In reading out the photosensors, the charge on each photosensor is transferred to a storage register. A length of the exposure period is controlled by the exposure control circuitry 48 (shown schematically in FIG. 2) of the board camera 40. The transferred charges are read out from the storage register to generate an analog voltage signal 50 representive of the video image. This video signal 50 is amplified by output gain circuitry 52 (shown schematically in FIG. 2) of the board camera 40 to generate a gain adjusted composite video signal 54 suitable for decoding. The gain adjusted video signal 54 is an analog signal. A portion of the signal 54 corresponding in time to one exposure period constitutes a field of the video image and represents a series of charges associated with each of the 437,664 photosensors for that exposure period. As noted above, a frame of the video image is comprised of two interlaced fields.

If the exposure period of the board camera 40 is too short, the charges on most of the photosensors in the photosensor array 42 will be insufficient and the generated video image of the dataform will be too dark. Therefore, the gain adjusted video signal 54 will not be suitable for decoding. On the other hand, if the exposure period of the board camera 40 is too long, the photosensors of the photosensor array 42 will be overcharged and the generated video image will be too bright. Again, the gain adjusted video signal 54 will not be suitable for decoding. If the "raw" video image voltage signal 50 is subject to too much or too little gain, the resulting gain adjusted composite video signal 54 will not be suitable for decoding.

Upon powering up the reader module 10, the board camera produces a video image of the target field. The fuzzy logic image control circuitry 18 captures a portion of the gain adjusted video signal 54 corresponding to a frame and determines if the captured frame is suitable for decoding images in the frame. If the fuzzy logic image control circuitry 18 determines that the captured frame is suitable for decoding, a representation of the frame is stored in memory 19 for subsequent decoding by decoding circuitry 92 (FIG. 2).

If the fuzzy logic image control circuitry 18 determines that the captured frame is not suitable for decoding, one or more of the board camera operating parameters is adjusted via the control signals generated by the image control circuitry 18. Another image frame is captured and analyzed by the image control circuitry 18 for decoding suitability. Thus, the configuration of the reader module 10 provides an open loop feedback between the fuzzy logic image control circuitry 18 and the board camera 40.

Figure 5:
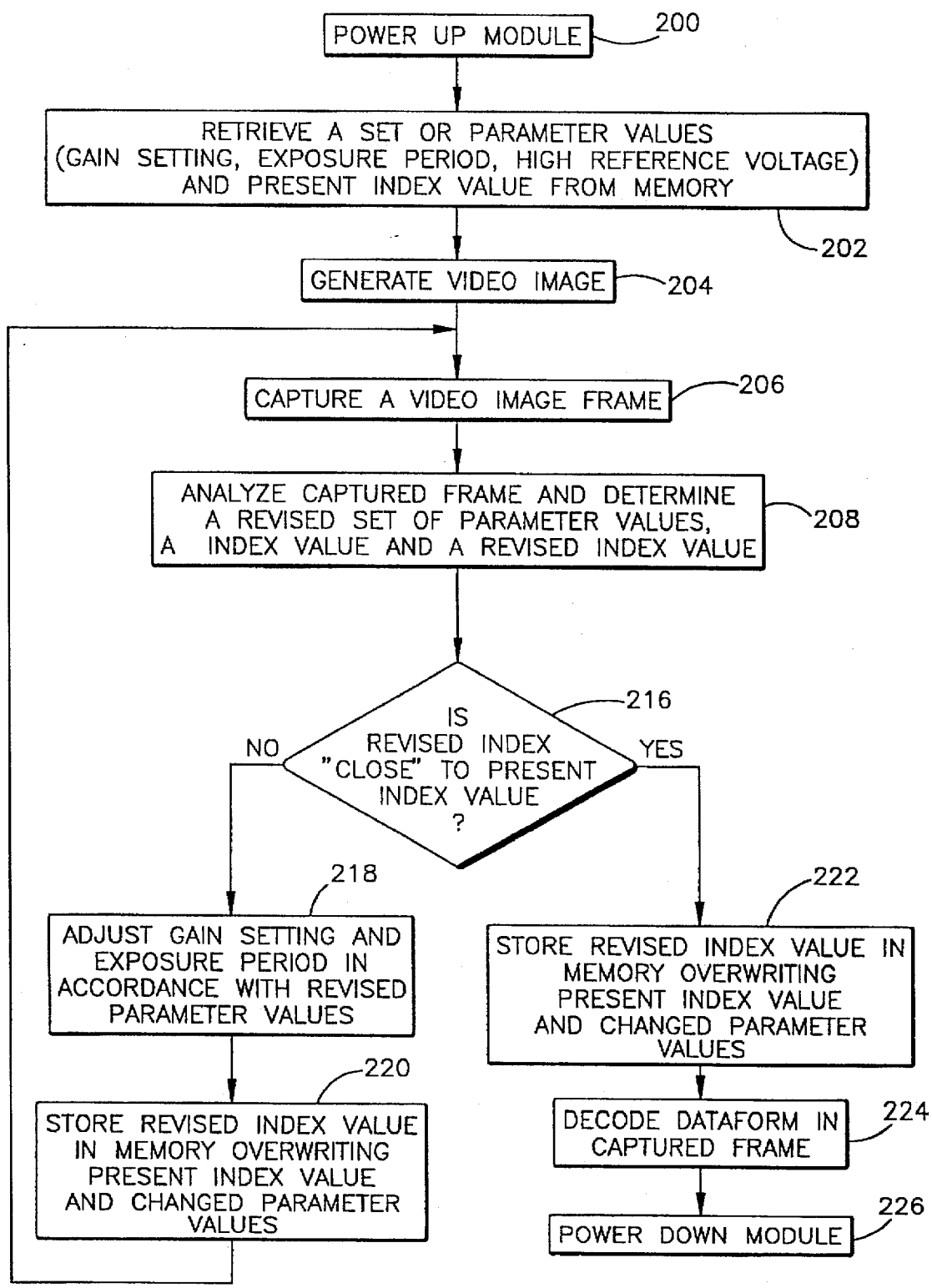
FIG. 5 is a flow chart illustrating operation of a fuzzy logic exposure control system of the dataform reader module of FIG. 1.

The fuzzy logic image control circuitry 18 steps through an iterative process to obtain a video image frame suitable for decoding. The iterative process includes the steps of capture, analysis and adjustment, that is, capturing a video image frame, analyzing the frame for decoding suitability, and, if not suitable, adjusting one or more of the board camera operating parameters. A flow diagram set forth in FIG. 5 illustrates this iterative process. For most dataform images, three or fewer iterations are required to achieve a suitable image for decoding, that is, three or fewer frames must be captured.

The rapid execution of the iterative process by the fuzzy logic image control circuitry 18 results in a very short latency period. The latency period is defined as the time elapsed between powering up the reader module 10 and achieving a suitable video image for decoding. The latency period includes the time required to synchronize the read out of the photosensors plus the time required to adjust the gain and exposure period parameters of the board camera 40. With the reader module 10 of the present invention, a latency period of 50 ms or less is achievable.

Returning to FIG. 2, the gain adjusted video signal 54 generated by the board camera 40 is coupled to an input port 56 of the control and decoder board 14. The video signal 54 is decoded and is subjected to fuzzy logic analysis by the fuzzy logic image control circuitry 18. Based on the fuzzy logic analysis, the control circuitry 18 generates analog control signals 58, 60 which are coupled to input ports 62, 64 of the control and decoder board 14. The control signal 58 is input to the exposure period circuitry 48 to control the exposure period of the board camera 40 while the control signal 60 is input to the gain circuitry 52 to control the gain setting of the board camera.

The gain adjusted composite video signal 54 is coupled to the A/D converter 24. Also input to the A/D converter 24 are two analog reference voltage signals 66, 68. The voltage signal 66 is a high reference voltage signal while the voltage signal 68 is a low reference voltage signal. The fuzzy logic control unit 20 generates index values 70, 72 corresponding to the high and low reference voltage signals 66, 68. The index values 70, 72 are converted by the D/A converter 22 into the respective analog reference signals 66, 68. The A/D converter 24 utilizes the analog high and low reference voltage signals 66, 68 to convert the gain adjusted composite video signal 54 to a series of gray scale values. The gray scale is a series of achromatic tones of gray with the endpoints being white and black. The gray scale utilized by the image control circuitry of the present invention has a range from 0 (black) to 255 (white). For a given captured video image frame, there is one gray scale value for each of the 437,664 pixels. A gray scale value corresponding to a pixel provides a relative measure of the intensity or brightness of the pixel. A signal 74 representing the gray scale values corresponding to a captured frame is coupled to the signal processing circuitry 26.

The gray scale value signal 74 associated with a captured frame of the video image comprises a series of 437,664 gray scale values. The signal processing circuitry 26 operates to extract an intensity histogram value (I) 76, a dynamic range maximum value (DRMAX) 78 and a dynamic range minimum value (DRMIN) 80 from the gray scale signal 74. The I, DRMAX, DRMIN values 76, 78, 80 are input to the fuzzy logic control unit 20. The fuzzy logic control unit 20 uses the values to generate digital control signals 82, 84 which are input to the D/A converter 22. The D/A converter 22 converts the digital gain control signal 82 and the digital exposure period control signal 84 to the analog gain control signal 58 and the analog exposure period control signal 60. The control signals 58, 60 are input to the ports 62, 64 to suitably adjust the gain circuitry 52 and the exposure period circuitry 48 of the board camera 40.

The signal processing circuitry 26 determines I (intensity histogram value) for a captured frame. I represents the number of gray scale values in the set of 437,664 gray scale values having a magnitude greater than or equal to 128. The gray scale value of 128 is chosen as the break-point since 128 is just above the midpoint of the 0 to 255 gray scale range.

The DRMAX and DRMIN values for the captured frame is also determined by the signal processing circuitry 26. If the magnitudes of the gray scale values are linearly plotted on an X—Y coordinate system, the magnitudes define an irregular, wavy pattern having alternating "peaks" and "troughs". The DRMAX value represents an averaged value (excluding outliers) of the "peaks" of the wavy pattern of gray scale magnitudes associated with the captured video image frame. The DRMIN value represents an averaged value (excluding outliers) of the "troughs" of wavy pattern of gray scale magnitudes associated with the captured video image frame.

Figure 3A:
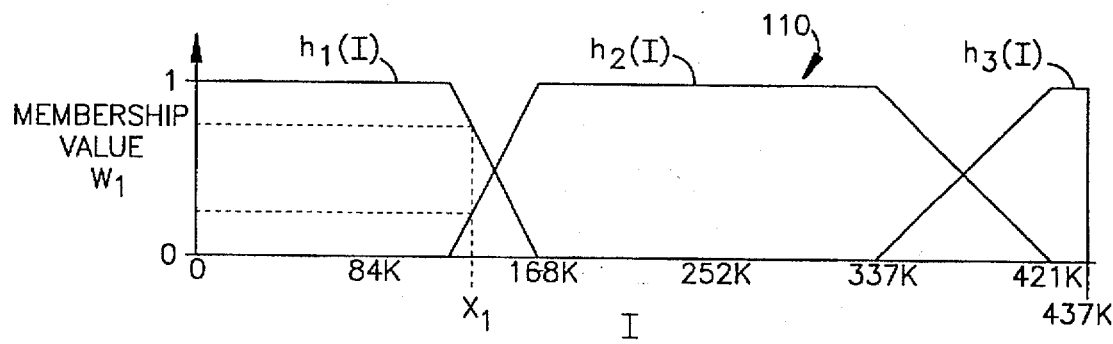
FIG. 3A is a graph of a membership function chart of a gray scale histogram value.
Figure 3B:
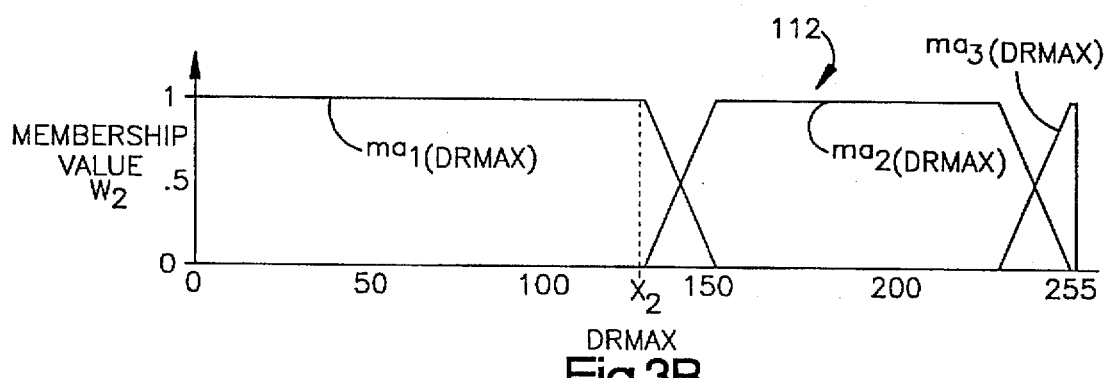
FIG. 3B is a graph of a membership function chart of a dynamic range maximum value.
Figure 3C:
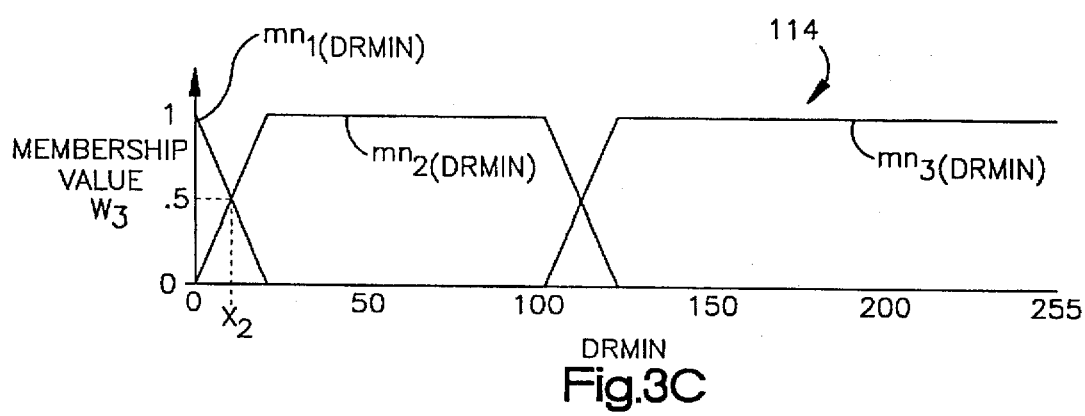
FIG. 3C is a graph of a membership function chart of a dynamic range minimum value.

The I, DRMAX and DRMIN values are input to the fuzzy logic control unit 20. The fuzzy logic control unit 20 utilizes the I, DRMAX and DRMIN values to calculate an index modification value. The fuzzy logic control unit 20 accesses three empirically derived membership function charts 110 (FIG. 3A), 112 (FIG. 3B), 114 (FIG. 3C) to derive weight factors used in calculating the index modification value using an index modification value formula. Each membership function chart 110, 112, 114 is comprised of three overlapping ramp functions.

The membership function chart 110 is comprised of the functions labeled $h_1(I)$, $h_2(I)$, $h_3(I)$. The function $h_1(I)$ corresponds to an image frame which is too dark, $h_2(I)$ corresponds to an image frame which is acceptable or normal, and $h_3$ corresponds to an image frame which is too bright.

The membership function chart 112 is comprised of the functions labeled $ma_1(DRMAX)$, $ma_2(DRMAX)$, $ma_3(DRMAX)$. The dynamic range maximum value for a properly exposed image should be in the range of 150 to 230 gray scale value. The $ma_1(DRMAX)$ function represents an image frame having a dynamic range maximum value below 150, which is too low, while the $ma_3(DRMAX)$ function represents an image frame having a dynamic range maximum value above 230, which is too high.

The membership function chart 114 is comprised of the functions labeled $mn_1(DRMIN)$, $mn_2(DRMIN)$, $mn_3(DRMIN)$. The dynamic range minimum value for a properly exposed image should be in the range of 20 to 100 gray scale. The $mn_1(DRMIN)$ function represents an image frame having a dynamic range minimum value below 20, which is too low, while the $mn_3(DRMIN)$ function represents an image frame having a dynamic range minimum value above 100, which is too high.

The determined I value is utilized by the fuzzy logic control unit 20 to determine a weight factor for each of the three functions $h_1(I)$, $h_2(I)$, $h_3(I)$ comprising the membership function chart 110. The determined DRMAX value is utilized by the fuzzy logic control unit 20 to determine a weight factor for each of the three functions $ma_1(DRMAX)$, $ma_2(DRMAX)$, $ma_3(DRMAX)$ comprising the membership function chart 112. Finally, the determined DRMIN value is utilized by the fuzzy logic control unit 20 to determine a weight factor for each of the three functions $mn_1(DRMIN)$, $mn_2(DRMIN)$, $mn_3(DRMIN)$ comprising the membership function chart 114.

In the index modification value formula, each of the functions $h_1(I)$, $h_2(I)$, $h_3(I)$, $ma_1(DRMAX)$, $ma_2(DRMAX)$, $ma_3(DRMAX)$, $mn_1(DRMIN)$, $mn_2(DRMIN)$, $mn_3(DRMIN)$, are used to calculate a membership value. Each function is also assigned a weight as per the following table.

| Membership Function | Weight |
|---|---|
| $h_1(I)$ | −1 |
| $h_2(I)$ | 0 |
| $h_3(I)$ | +1 |
| $ma_1(DRMAX)$ | −1 |
| $ma_2(DRMAX)$ | 0 |

-continued

| Membership Function | Weight |
|---|---|
| $ma_3(DRMAX)$ | +1 |
| $mn_1(DRMIN)$ | −1 |
| $mn_2(DRMIN)$ | 0 |
| $mn_3(DRMIN)$ | +1 |

The empirically derived index modification value formula is:

$$\Delta\ \text{Index} = [7 \times \Sigma h_i(I) W_{1i}] + [1 \times \Sigma ma_i(DRMAX) W_{2i}] + [1 \times \Sigma mn_i(DRMIN) W_{3i}]$$

Where, $\Delta$ Index=index modification value, $h_i$=membership values for $h_1(I)$, $h_2(I)$ and $h_3(I)$ as set forth above, $W_{1i}$=weight factors $W_{11}$, $W_{12}$, $W_{13}$ associated with $h_1(I)$, $h_2(I)$ and $h_3(I)$ respectively, $ma_i$=membership values for $ma_1(DRMAX)$, $ma_2(DRMAX)$ and $ma_3(DRMAX)$ as set forth above, $W_{2i}$=weight factors $W_{21}$, $W_{22}$, $W_{23}$ associated with $ma_1(DRMAX)$, $ma_2(DRMAX)$ and $ma_3(DRMAX)$ respectively, $mn_i$=membership values for $mn_1(DRMIN)$, $mn_2(DRMIN)$ and $mn_3(DRMIN)$ as set forth above, and $W_{3i}$=weight factors $W_{31}$, $W_{32}$, $W_{33}$ associated with $mn_1(DRMIN)$, $mn_2(DRMIN)$ and $mn_3(DRMIN)$ respectively.

After determining the index modifications value ($\Delta$ index), the fuzzy logic control unit 20 calculates a revised index value based on the $\Delta$ index value and a present index value using the following formula:

Revised Index Value=Present Index Value+$\Delta$ Index

When the reader module 10 is powered up, the revised index value stored in the memory 19 at the termination of the previous reading session becomes the present index value for the current reading session. If no value is stored in memory, a default value such as nine (9) is used as the present index value.

The revised index value is used to determine an appropriate gain setting, exposure period and high and low reference voltage values using a look up table 100 stored in the memory 19. FIG. 4 illustrates the look up table 100 which is derived through empirical data. The first column 102 in the look up table 100 sets forth revised index values. Set forth as a function of the revised index values are an exposure period 104 in milliseconds (column 2), a gain setting 106 (column 3), an index value 70 corresponding to a reference high voltage value in volts 108 (column 4) and an index value 72 corresponding to a reference low voltage value in volts 109 (column 5).

As an illustrative example, assume that upon powering up the module 10, the first captured frame is analyzed by the signal processing circuitry 26 and results in the following values:

| I | 135,000 |
|---|---|
| DRMAX | 125 |
| DRMIN | 10 |

The above values are shown on the membership charts 110, 112, 114 as $X_1$, $X_2$, $X_3$ respectively. Further, assume that the revised index value at the termination of the last reading session was 20 and that this value was stored in the memory 19. As can be seen from the look up table of FIG. 4, corresponding toe the revised index value of 20 at the termination of the previous reading session, the exposure period of the board camera 40 would have been set at 4 milliseconds, the gain would have been set at the maximum value, the high reference voltage would have been set to a value corresponding to an index value of 70 and the low reference voltage would have been set to a value corresponding to a value of 10.

Turning to membership chart 110 (FIG. 3A), an I value of $X_1$=135,000 (135 k) results in membership values for functions $h_1(I)$, $h_2(I)$, $h_3(I)$ respectively of:

$H_1$=0.7
$H_2$=0.3
$H_3$=0.0

For membership chart 112 (FIG. 3B), a DRMAX value of $X_2$=125 results in membership values for functions $ma_1(DRMAX)$, $ma_2(DRMAX)$, $ma_3(DRMAX)$ respectively of:

$MA_1$=1
$MA_2$=0
$MA_3$=0

For membership chart 114 (FIG. 3C), a DRMIN value of $X_3$=20 results in membership values for functions $mn_1(DRMIN)$, $mn_2(DRMIN)$, $mn_3(DRMIN)$ respectively of:

$MN_1$=0.5
$MN_2$=0.5
$MN_3$=0

Substituting the determined membership values and weight factors from the proceeding tables, The fuzzy logic control unit 20 calculates the index modification value as follows:

$$\begin{aligned}
\Delta\ \text{Index} &= 7 \times [(-1)(.7) + (0)(.3) + (+1)(0)] \\
&\quad +1 \times [(-1)(1) + (0)(0) + (+1)(0)] \\
&\quad +1 \times [(-1)(.5) + (0)(.5) + (+1)(0)] \\
&= 7\ [-0.7] + 1\ [-1.0] + 1\ [-0.5] \\
&= 4.9 + -1.0 + -0.5 \\
&= -6.4
\end{aligned}$$

Next, the fuzzy logic control unit 20 calculates the revised index value by retrieving the revised index value of the previous reading session (namely the index value, 22) from the memory 19 and using that index value as the present index value. The fuzzy logic control unit 20 then utilizes the following formula to calculate the revised index value:

$$\begin{aligned}
\text{Revised Index Value} &= \text{Present Index Value} + \Delta\ \text{Index} \\
&= 20 + -6.4 \\
&= 13.6 \\
&= 14\ \text{(rounded to the nearest integer)}
\end{aligned}$$

As can be seen from the look up table of FIG. 4, given a revised index value of 14, the exposure period of the board camera 40 should be increased from 4 milliseconds to 10 milliseconds, the gain setting should remain at maximum, the reference high voltage should increased its present value which corresponds to an index value of 70 to a higher reference voltage which corresponds to an index value of 75 volts and the reference low voltage should remain at its present value which corresponds to an index value of 10. The actual reference voltage values which correspond to the index values are empirically determined. The fuzzy logic control unit 20 produces digital control signals 82, 84 (which are convened to analog control signals 60, 58 by the D/A converter) to cause the exposure period circuitry 48 to change the exposure period to 10 milliseconds and to cause the gain circuitry 52 to be maintained at maximum gain. The fuzzy logic control unit 20 also generates the index reference voltage signals 70, 72 which are also coupled to the D/A converter. The index reference voltage signals 70, 72 are coverted by the D/A converter 22 into the high and low reference voltage signals 66, 68. The revised index value of 14 would be stored in the memory 19 by the fuzzy logic unit 20 by overwriting the previous index value of 20. The revised values of exposure period (10 ms) and high reference voltage (voltage index value of 75) would be stored in the memory 19 by overwriting the previous values of 4 ms and an index value of 70.

In another aspect of the present invention, the fuzzy logic image control circuitry 18 generates a signal 90 which coupled to the illumination module 47 to disable a set of illumination LEDs 346 of the module when the revised index value corresponds to an exposure period of 4 ms or less. That is, the illumination LEDs 346 are disabled if the revised index value is equal to or exceeds a value of 16 (FIG. 4).

The iterative process of capture, analyze and adjust utilized by the reader module 10 to achieve a video image of the object or target field 166 suitable for decoding and illustrated in FIG. 5 will be described. Step 200 is the initial step of powering up the dataform reader module 10. Upon powering up, the image control circuitry 18 retrieves the values for the gain setting, the exposure period, the high reference voltage and the low reference voltage from the memory 19 as well as the present index value, as shown in step 202. These parameter values, correspond to a final set of parameter values utilized in the previous reading session. The retrieved values become the initial parameter values used by the reader module 10. The image control circuitry 18 generates control signals 58, 60 which are coupled to the board camera input ports 62, 64 respectively. The control signal 58 is coupled to the board camera exposure control circuitry 48 and causes the exposure period of the board camera 40 to be set to the retrieved value for the exposure period. Similarly, the control signal 60 is coupled to the board camera gain circuitry 52 and causes the gain of the board camera 40 to be set to the retrieved value of the gain.

The board camera 40 utilizes the retrieved gain setting and the retrieved exposure period to generate the gain adjusted analog voltage signal 54 representative of a video image of a target dataform (step 204). As shown in step 206, the fuzzy logic image control circuitry 18 captures a portion of the gain adjusted video signal 54 corresponding to one frame of the image of the dataform. Alternately, a field could be captured and used for analysis by the image control circuitry 18. As explained previously, the captured frame is utilized by the image control circuitry 18 to determine a revised set of parameter values for the gain setting and the exposure period for the board camera 40 and the two reference voltage values based on the corresponding voltage index values as well as index modification value and a revised index value (step 208).

At step 218, the image control circuitry 18 determines whether the difference between the revised index value and the present index value is within a predetermined range. If the difference is within the predetermined range, the captured image is suitable for decoding. If the difference is outside the predetermined range, the image control circuitry 18 generates signals 58, 60 to adjust the gain setting and the exposure period to the revised parameter values (step 218). At step 220, the revised index value and revised parameter values are stored in the memory 19 by overwriting the existing present index and parameter values in memory. The revised index value then becomes the present index value. Another video image frame is captured (step 206) and the analysis process is repeated (steps 208, 216).

If the difference between the revised index value and the present index value is within the predetermined range, the revised index value and the revised parameter values are stored in memory 19 by overwriting the present values (step 222). At step 224, the reader module 10 utilizes decoding circuitry to decode the dataform in the captured frame. Finally, the reader module 10 is then powered down, as seen in step 226, to conserve power between reader sessions.

The reader module 10 of the present invention will generally require from one to three image fields to be captured before for correct exposure is achieved. However, the capture and compare step of the circuitry are rapid and even if three image fields are required to be captured, the latency time until equilibrium is achieved is normally 50 ms or less.

Referring again to FIG. 1, the control and decoder board 14 also includes dataform decoding circuitry 92 including a decoding system, embodied in code operable by the microprocessor 16, which is operative to decode the dataform in the target or image field 166. An appropriate decoder system is described in U.S. patent application Ser. No. 08/443,909 filed May 17, 1995, and U.S. patent application Ser. No. 08/456,113, the contents of both applications are hereby incorporated by reference. Other decoder systems known in the art are also contemplated by the present invention. The decoded results are made available to other processing circuitry (discussed later) through a data transfer link 300 (FIGS. 1, 2 and 6).

The control and decoder board 14 further includes laser module emulation circuitry 94 embodied in code executable by the microprocessor 16. The emulation circuitry 94 operates to encode the decoded results in a standard 1D bar code format, such as Code 39, and output a square wave signal emulating the square wave signal of a laser scanner module scanning the 1D code. It should be appreciated that this feature provides for electrical compatability with a laser scanner module while providing the capability of reading an assortment of dataforms including 2D bar codes and matrix codes. When operating in laser emulation mode, the square wave signal is made available for further processing through the data transfer link 300.

In yet another embodiment of the reader module 10, because the reader module captures an image of the target field or area 166, the module, in addition to capturing the image of a dataform, can be used to photograph an object in the target area. For example, an operator can use the reader module 10 to photograph a damaged product and also capture an image of a dataform associated with the damaged product. When a photograph image is captured, the decoder board will transfer a digital image, such as a bit map, of the image via data transfer link 300.

FIG. 6 shows the cutaway top view of camera assembly 12 with a microprocessor 351, data transfer link 300, and associated circuitry for performing the open loop gain control, open loop exposure control, decoding and other above mentioned functions integrated into the camera assembly.

The performance of the dataform reader module 10 is enhanced by providing an optical system 302 including the optic assembly 44 having an extended working range. Based on the position between the optic assembly 44 and the photosensor array 42, there exists a best focus position S2 in front of the optic assembly 44 at which an image of an object in the object or target field 166 will be sharpest on the photosensor array 42. The image gradually degrades as the object is moved towards the near field cut off distance S1 and a far field cut off distance S3. The optic assembly 44 also has an angular field of view 168 which is wide enough to image large dataforms at the far field S3 and still provide a large image of a small dataform located at the near field S1. In the preferred embodiment, the optic assembly 44 has a working range from about 2.5 inches to at least 8.5 inches from the front surface of the optic assembly, with best focus distance being at 5.5 inches. The preferred field of view corresponds to a target area or surface 5 inches long by 3.75 inches wide at a distance of 8.5 inches from a front surface 186 of an outermost lens 182.

The optical system 302 that will meet these requirements includes a symmetrical lens structure. Two substantially identical lenses 182 and 184 will be positioned with mirrored symmetry about an aperture 190. The surface 186 of lens 182 is aspherical having a magnitude and shape defined as an even asphere having a radius of curvature of 1.5298 mm, a conic constant of −0.019890, a 6th order aspheric deformation coefficient of 0.0096 mm, an 8th order coefficient of −0.0057, and a 10th order coefficient of 0.0023. A back surface 188 of the lens 182 is a spherical surface with a radius of curvature of 1.6004 mm. The aperture 190 has a width of 0.3606 mm between the lenses 182 and 184 providing the optic assembly 44 with an F#13. The diameter of the lens 182, 184 are not critical to the present invention. A more detailed discussion of the optical system 302 of this invention can be found in U.S. patent application Ser. No. 08/494,435, assigned to the same assignee as the present invention. The contents of U.S. patent application Ser. No. 08/494,435 is incorporated herein in its entirety by reference.

Figure 10:
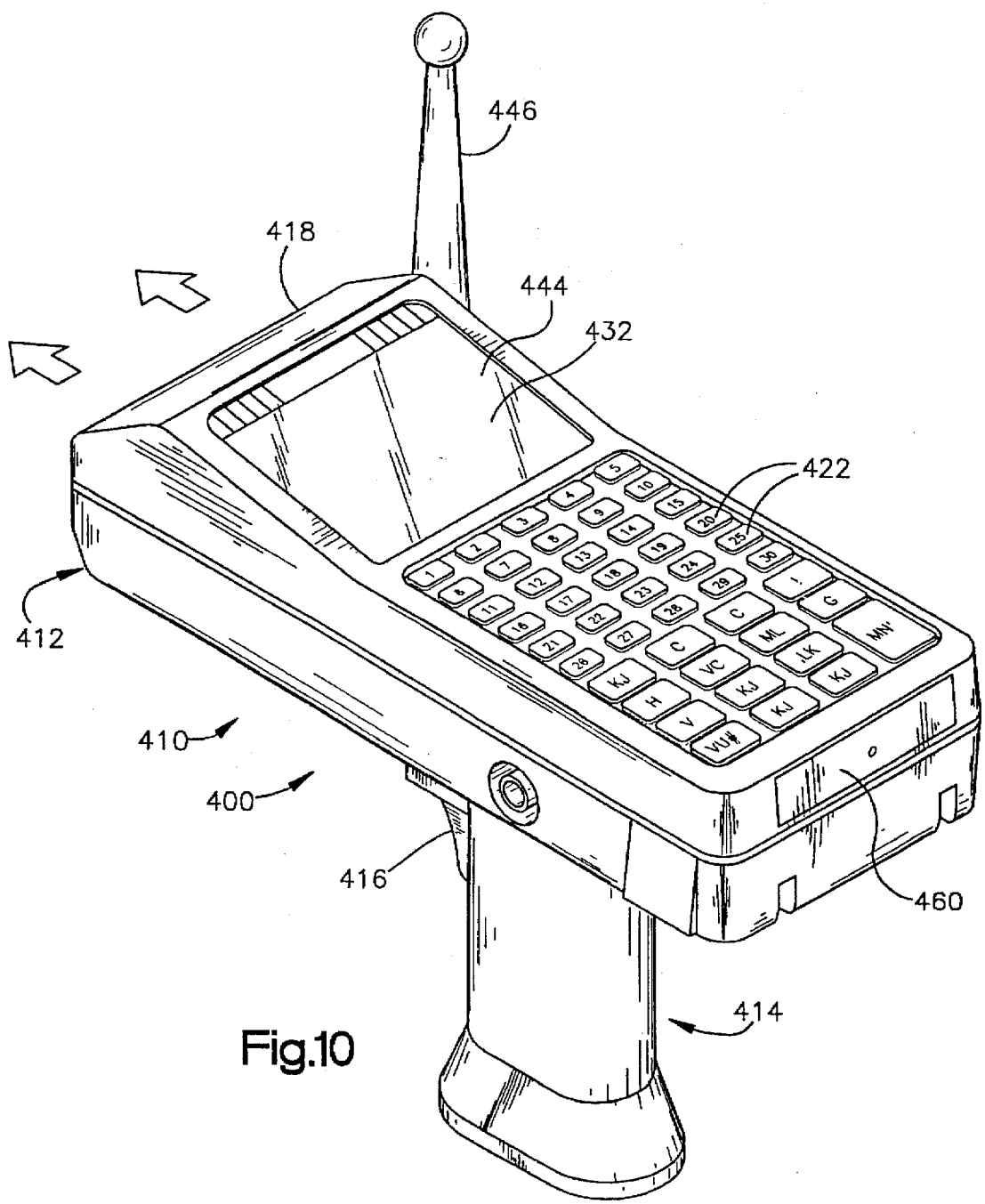
FIG. 10 is a perspective view of a portable data collection system including the dataform reader module of FIG. 1.
Figure 11:
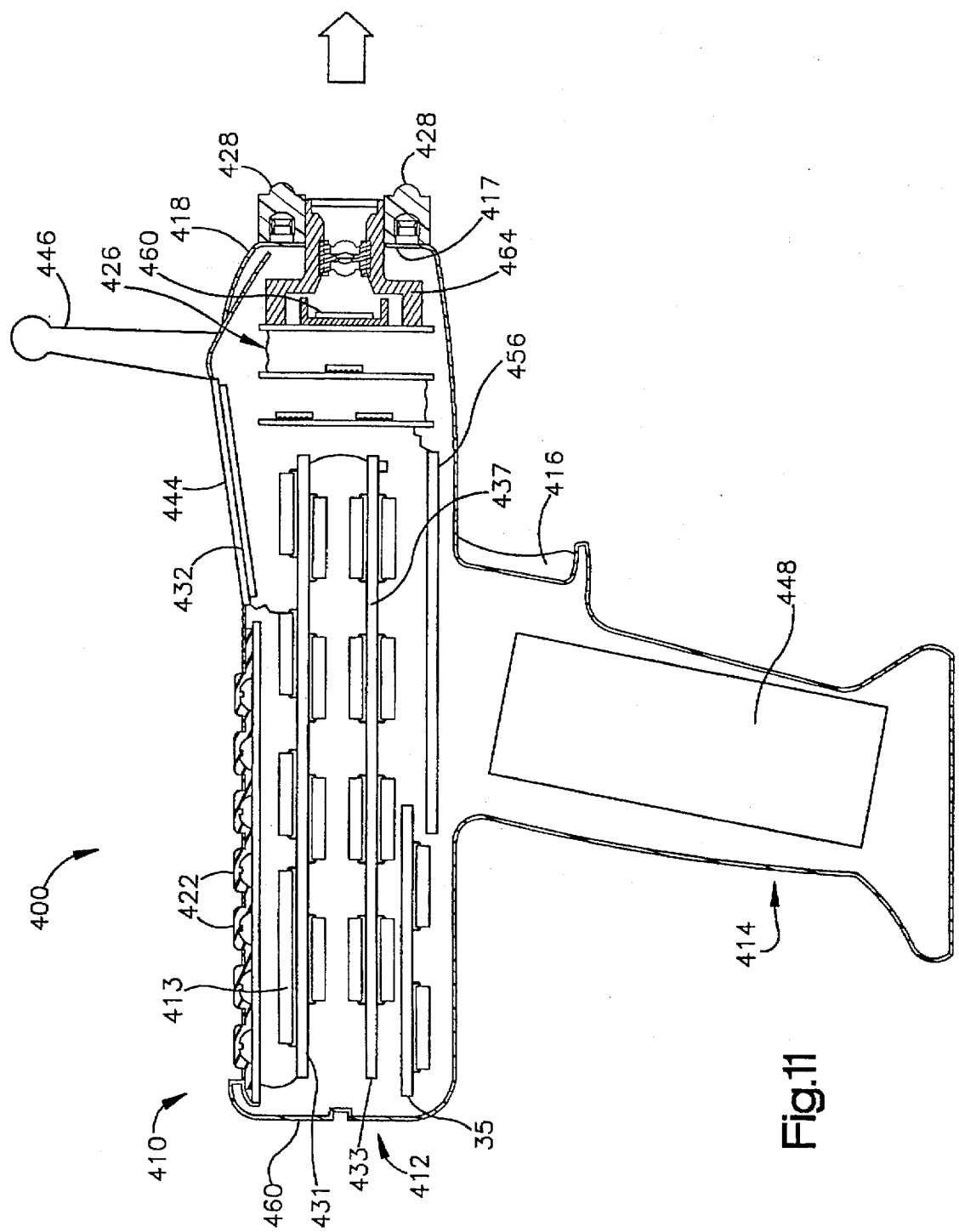
FIG. 11 is a side view, partially in section and partially in elevation, of the portable data collection system of FIG. 10.
Figure 12:
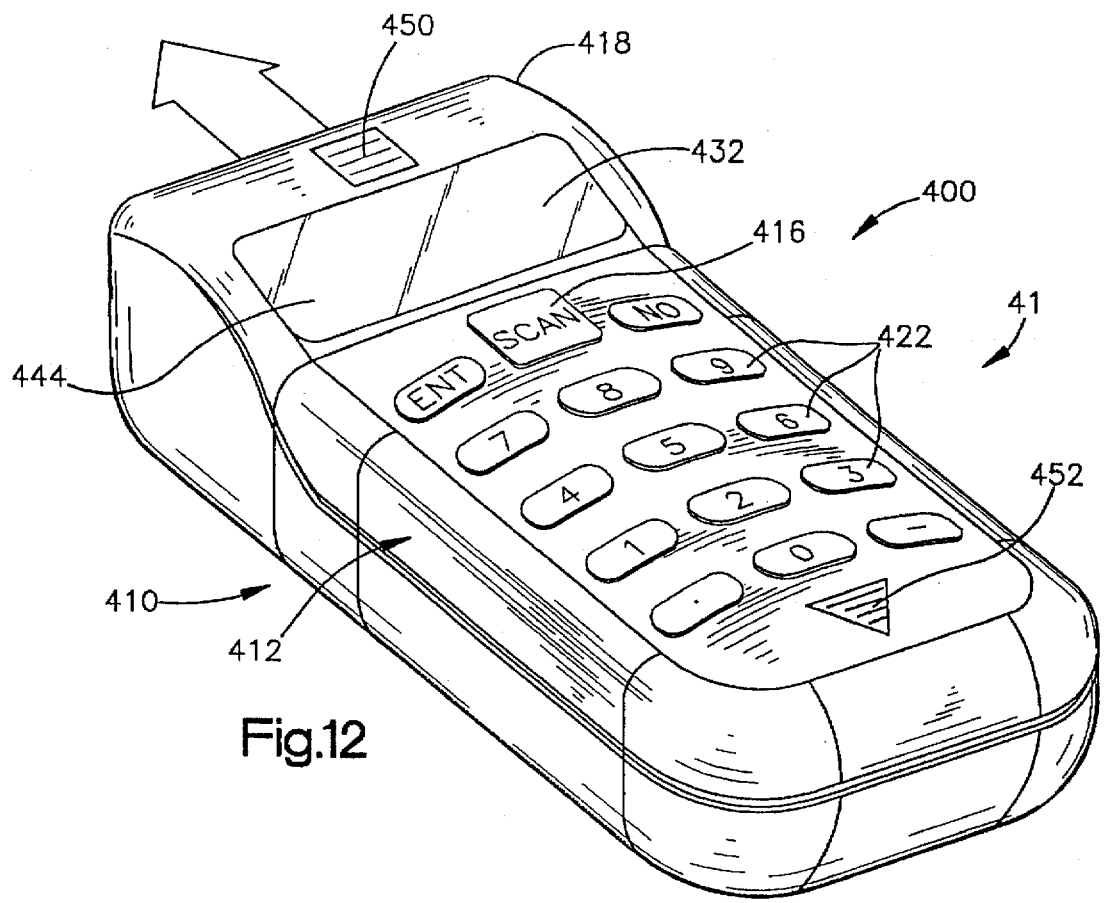
FIG. 12 is a perspective view of an alternate embodiment of a portable data collection system including the dataform reader module of FIG. 1.
Figure 13:
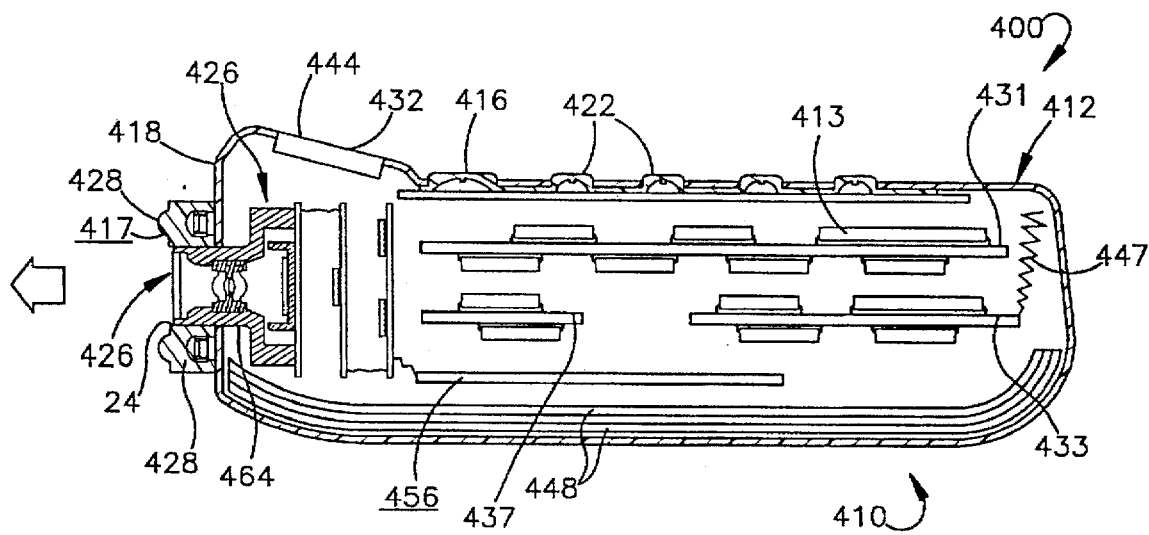
FIG. 13 is a side view, partially in section and partially in elevation, of the portable data collection system of FIG. 121.

Because the optical system 302 is used in a portable data collection system 400 (one embodiment of a portable data collection system of the present invention is illustrated in FIGS. 10 and 11 and a second embodiment of a portable data collection system of the present invention is illustrated in FIGS. 12 and 13), it is desirable that the reader module 10 be lightweight and impact resistant. In the preferred embodiment, the optical material used for fabricating the lenses 182, 184 is comprised of plastic. Using plastic optics will reduce the weight of the optical system 302 by about 60% compared to an equivalent glass assembly and provide a system which is more impact resistant. Another benefit of using plastic optics is that the costs associated with grinding aspherical surfaces on glass lenses is avoided. An aspherical surface is easily formed by injection molding a plastic lens. While the optical system 302 set forth herein provides desired attributes, those skilled in the art are aware of other optics with similar performance characteristics.

Because the desired working range and field of view of the reader module 10 dictates that the optical system 302 have a large F# (F#5.6 or greater), the illuminator module 47 must provide adequate illumination of the target field 166 during the exposure period so that enough reflected light is absorbed by the photosensor array 42 to generate a suitably bright video image. However, the exposure period is necessarily limited to 0.01 seconds or less (see FIG. 4) to minimize the effect of the operator's hand jittering during the reading session. The exposure period of 0.01 seconds or less is substantially less than current CCD readers. Therefore, the illumination module 47 of the reader module 10 must provide adequate illumination to accommodate the large F# and short exposure time.

Proper exposure of the sensor array 42 requires an object field illumination of 0.3 lux assuming an exposure period of 0.03 seconds and an F#1.2. To determine the proper object field illumination for a 0.01 second exposure period and an F#13, the following formula is used:

$$\frac{(\text{Illumination intensity})(\text{Exposure period})}{(F\#)^2} = \text{Constant}$$

Therefore, the minimum required object field illumination for the reader module 10 of this invention is 106 lux at the far field cut off distance S3.

Figure 7:
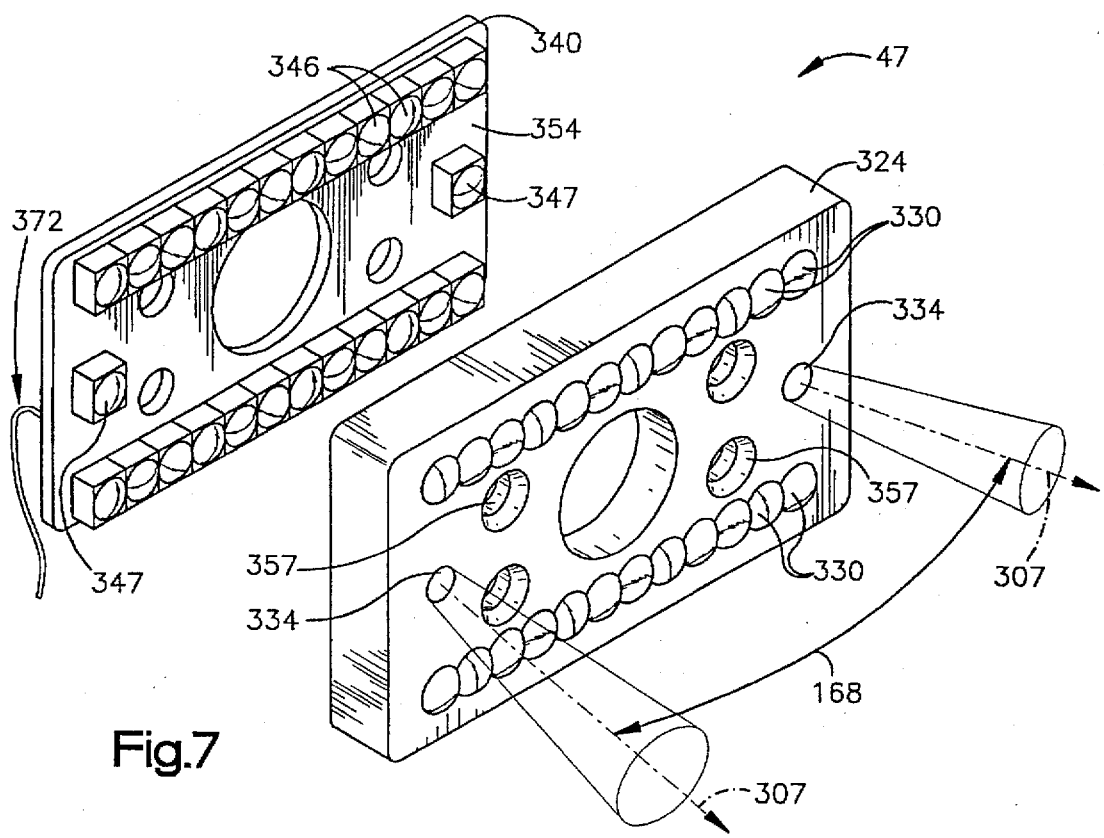
FIG. 7 is an exploded perspective view of an illumination module of the dataform reader module of FIG. 1.

Referring to FIG. 7, which is a perspective explosion view of the illumination module 47, it can be seen that module includes a lens array 324 and a printed circuit board assembly 340. The printed circuit board assembly 340 includes a plurality of surface mounted illumination LEDs 346 secured to a printed circuit board 354. The printed circuit board 354 includes printed conductors and power lead 372 operative for supplying power to the illumination LEDs 346. A suitable surface mount illumination LED is produced by the MarkTech Corporation of Latham, N.Y., as Part No. MTSM735K-UR or MTSM745KA-UR. Each illumination LED 346 provides illuminosity of 285 mini candela (mcd) over an angular illumination field of about 68°. The small footprint of the illumination LEDs 346 provides for twelve to be placed in a row measuring less than 1.5". The printed circuit board assembly 354 includes two rows of illumination LEDs 346 totaling twenty four LEDs providing 6840 mcd of uniform illumination over a 68° field.

The lens array 324 includes a plurality of illumination lens cell 330 each of which are aligned with a corresponding illumination LED 346. The exposure illumination lens cells 330 direct the 68° field of illumination from each illumination LED 346 into a smaller uniform illumination field corresponding to the field of view 168 of the optic assembly 44 (about 50°).

Figure 8:
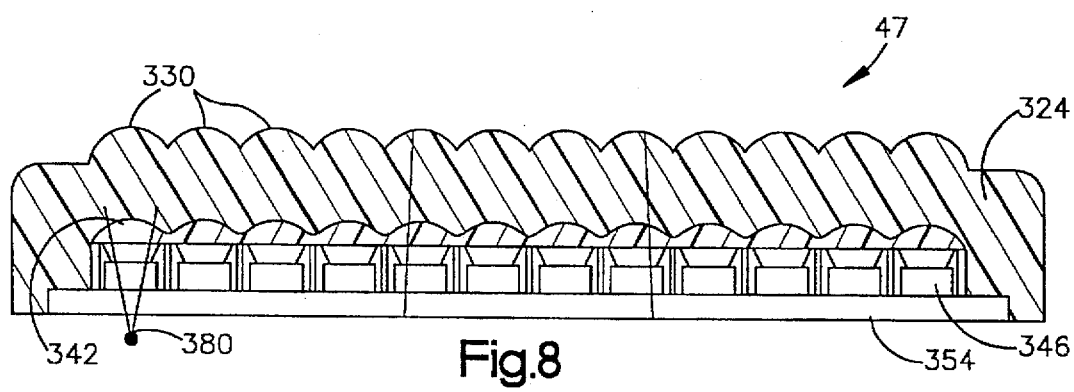
FIG. 8 is a side cross sectional view of a portion of the illumination module of FIG. 7.

Referring to FIG. 8, which shows a cross section of the assembled illumination module 47, it can be seen that each illumination lens cell 330 has an inner lens surface 342 and a focal point 380. By locating the illumination LEDs 346 between the focal point 380 and the interior surface 342, the lens cell 330 acts as a light directing element rather than an imaging element thereby avoiding hot spots in the target field 166 and providing a highly uniform illumination. The 68° field of illumination from each illumination LED 346 is gathered by each illumination lens cell 330 and directed into a field corresponding to the optical system field of view 168 which is smaller than 68°. Furthermore, because the fields of view of the exposure illuminator lens cells 330 overlap, there is "cross talk" between the illuminator LEDs 346 such that illumination from two or more illumination LEDs is directed towards the same portion of the target field 166. Over the optic assembly field of view 168, the 6840 mcd of illumination provided by the illumination LEDs 346 will provide an illumination intensity in excess of 106 lux at the far field cut-off distance of 8.5" (S3 in FIG. 6).

Referring back to FIG. 7, two targeting lens elements 334 positioned over two targeting LEDs 347 project two pencils of targeting illumination 307, forming hot spots, into the target area at angles corresponding to the optical systems field of view 168 (FIG. 6). The hot spots are visible to the operator and facilitate positioning of the portable data collection system 400 (FIGS. 10–13) so that the target dataform (not shown) is within the field of view 168 of the optical system 302.

The lens array 324 forms the front surface of the illumination module 47 protecting the printed circuit board assembly 340 from physical impact as well as from dirt, moisture and other harmful elements found in the environment. Therefore, the lens array 324 is preferably molded of an impact resistant acrylic or other suitable material that has a high illumination transmittivity and durability necessary for the environment in which a portable data collection system of the present invention is operated. To further protect the printed circuit board assembly 340 from harmful elements in the environment, a conformal coating is applied to the board assembly 340 and the assembly is bonded into a cavity in the back of the lens array 324 with a cynoacrolate, UV curing or structural adhesive.

Referring to FIGS. 1 and 7, the illumination module 47 may be secured to the from of the camera housing 46 by inserting four screws through the four holes 357 in the illumination module and threading them into the co-axially aligned holes 359 in the camera housing 46.

Figure 9:
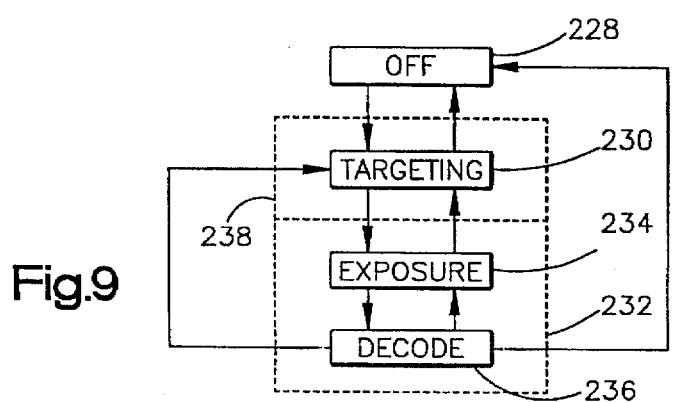
FIG. 9 is a state chart illustrating operation of a power control circuitry of the dataform reader module of FIG. 1.

Because the reader module 10 is designed for use in portable data collection system 400, the module includes power savings circuitry designed to operated with a two position manually activated trigger 416 (FIGS. 10–13). The trigger may be either a two position trigger (released and pulled) or a three position trigger (released, first position and second position). The circuitry controls operation of the board camera 40 and the illumination module 47 during a reading session. FIG. 9 shows a state chart representative of the power control circuitry. When in the off state 228 power is not supplied to either the illumination module 47 or the board camera 40.

When the three position trigger is pulled to the first position, the reader module 10 moves to the targeting state 230. In the targeting state, the microprocessor 16 actuates the targeting LEDs 347 while the board camera 40 and the illumination LEDs 346 are off. When the three position trigger is pulled to the second position, the module 10 enters the dataform read state 232. The dataform read state has two sub-states, an exposure state 234 and a decode state 236. In the exposure state 234, the targeting LEDs 347 are turned off while the illumination LEDs 347 and board camera 40 are actuated.

After capture of an image, the module 10 enters the decode sub-state 236, wherein, the illumination LEDs 346 and board camera 40 are off while the targeting LEDs 347 are on to assist the operator in holding the reader system 400 in position in case image capture and decoding is not successful. If a successful decode occurs, the reader module 10 returns to the off state 228. If the trigger is released, the reader module 10 returns to the targeting state 230 and the off state 228. A time out can also cause the module 10 to return to the off state without a successful decode.

If the data collection system 400 only has a two position trigger, the module 10 can operate in two embodiments. In the first embodiment, a trigger pull causes the module 10 to enter the targeting state 230. Releasing the trigger causes the system to enter the dataform read state 234. The exposure sub-state 234 and the decode sub-state 236 operate similar to the three position trigger embodiment. A time out will cause the module 10 to return to the off state.

Alternatively, a trigger pull may cause the module 10 to enter a fully automatic read state 238. The module 10 will automatically enter targeting sub-state 230 for a period of time and then enter the dataform read state 232. Operation of the dataform read state is the same as the above discussed embodiments. A trigger release will cause the module 10 to return to the off state 228.

FIGS. 10 & 11 and 12 & 13 illustrate two embodiments of the portable data collection system 400 in accordance with this invention. Like numerals are used to identify similar parts in the two embodiments. In the portable data collection system 400 shown in FIGS. 10 & 11, the system comprises a housing 410 which is generally a gun shaped. The housing 410 includes an upper portion 412, forming an upper enclosure, and a handle portion 414 extending below the upper portion 412. The housing 410 is constructed of a suitable impact resistant plastic that provides both durability and lightweight. A two-position trigger switch 416 is appropriately mounted and used to provide a signal to initiate a dataform reading session. A plurality of key switches 422 and a display screen 432 with an overlaying touch panel 444 are visible through an aperture in the upper portion 412 facing the operator.

The portable data collection system 400 shown in FIGS. 12 & 13 includes a generally rectangular housing 410 configured to be held in the palm of the operator's hand. A plurality of key switches 422 on an upper portion 412 of the housing 410 are positioned to be operated by the same hand holding the data collection system 400. Visible through an aperture of the upper portion 412 is a display screen 432 with an overlaying touch panel 444. The housing 410 is constructed of a suitable impact resistant plastic for both durability and light weight. A multi-position trigger switch 416, to initiate a dataform reading session is centrally located on the upper portion 412 surface to enable initiation of a reading session by the operator's thumb.

Referring to FIGS. 11 and 13 which show a sectional view of the portable data collection systems 400 of FIGS. 10 and 12, respectively, it can be seen that each system includes a reader module comprising a camera assembly 426 and a control and decoder board 456 electrically coupled thereto. The camera assembly 426 is positioned inside of the housing 410 immediately behind a front portion 418 of the housing. An illumination module 428 is mounted to the front portion 418 and a camera assembly housing 464 projects through an aperture 417 in the front portion 418 and an aligned aperture in the illumination module 428. A seal (not shown) may be placed around a nose of the camera assembly housing 464 to create a tight seal between the housing and the system housing 410 to prevent dirt and moisture from entering the interior of the system housing through the aperture 417.

In the preferred embodiment, the control and decoder board 456 is coupled to a main control board 431 which includes a microprocessor 413 for further processing the data transferred from the control and decoder board 456 to the main control board 431 via a data transfer link.

The main control board 431 includes a serial output port coupled to a connector on the housing operative to transfer the decoded data or image data to a remote terminal through a cable connection (not shown). The connector may be a traditional pin connector to which a mating connector is secured. Alternatively, as shown in FIGS. 10 and 11, the connector may comprise conductive contact surfaces 460 (FIGS. 10 & 11) on the exterior of the housing 410 which align with mating contact surfaces when the device is placed in a docking station (not shown).

Because the data collection system 400 is intended for portable use, a wired connection to a host computer is impractical in many situations. Therefore, the portable data collection system 400 includes a spread spectrum micro radio mounted on a board 433 (FIGS. 11 and 13) providing a wireless link between the main control board 431 and a remote host computer (not shown). An external antenna 446 as shown in FIG. 10 or internal antenna 447 as shown in FIG. 13, operate to improve radio communication reception. The spread spectrum radio board 433 includes digital and analog circuitry for transmitting and receiving data in a wireless network such as an IEEE 802.11 compatible direct sequence spread spectrum or frequency hopping spread spectrum network.

Power is supplied to the circuitry of the system 400 by a power cell 448. The spread spectrum radio and the dataform reader module both draw significant current from the power cell 448. Therefore, the radio should not operate during a dataform reading session and a dataform reading session should not start during communication to limit peak current draw. Therefore, the radio circuitry and the reader module provide blocking signals to each other to assure that both components doe not draw power simultaneously. The blocking signal from the radio to the reader module will prevent the initiation of a reading session. The session will be delayed until the signal desists. The blocking signal from the reader module to the radio will prevent the radio from sending or receiving data packets. Therefore, the network transmission protocol must be such that the radio in the portable dataform reader has complete control over when to transmit a packet and when it can receive a data packet. One such network protocol is the reverse poll protocol as described in U.S. Pat. No. 5,276,680 and assigned to Telesystems S/W Inc. The '680 patent is hereby incorporated in its entirety by reference.

In the reverse poll protocol network, the portable device radio may transmit data packets to a network access point at any time, subject to the carrier frequency being free. However, the access point can only send a packet to the portable device within a time window following receipt of a packet from the portable device. To assure that the access point has enough opportunities to transmit data to the portable device, the portable device will periodically send packets even though the packets contain no significant data.

While the spread spectrum radio is effective for transmitting the decoded contents of a dataform, the radio's limited bandwidth makes it impractical for transmitting an entire uncompressed image. An image compression algorithm useful to reduce the size of a digital image file is the 2D wavelet transform as described in "A 64 kb/s Video Code Using the 2-D Wavelet Transform" by A. S. Lewis and G. Knowles, published in IEEE Computer Society Press, Order Number 2202. For example, the HARC wavelet transform system, available from Houston Advance Research Center in Houston, Tex., can be used to compress the photographic image before it is transmitted with an image compression ratio of up to 400:1.

Figure 14:
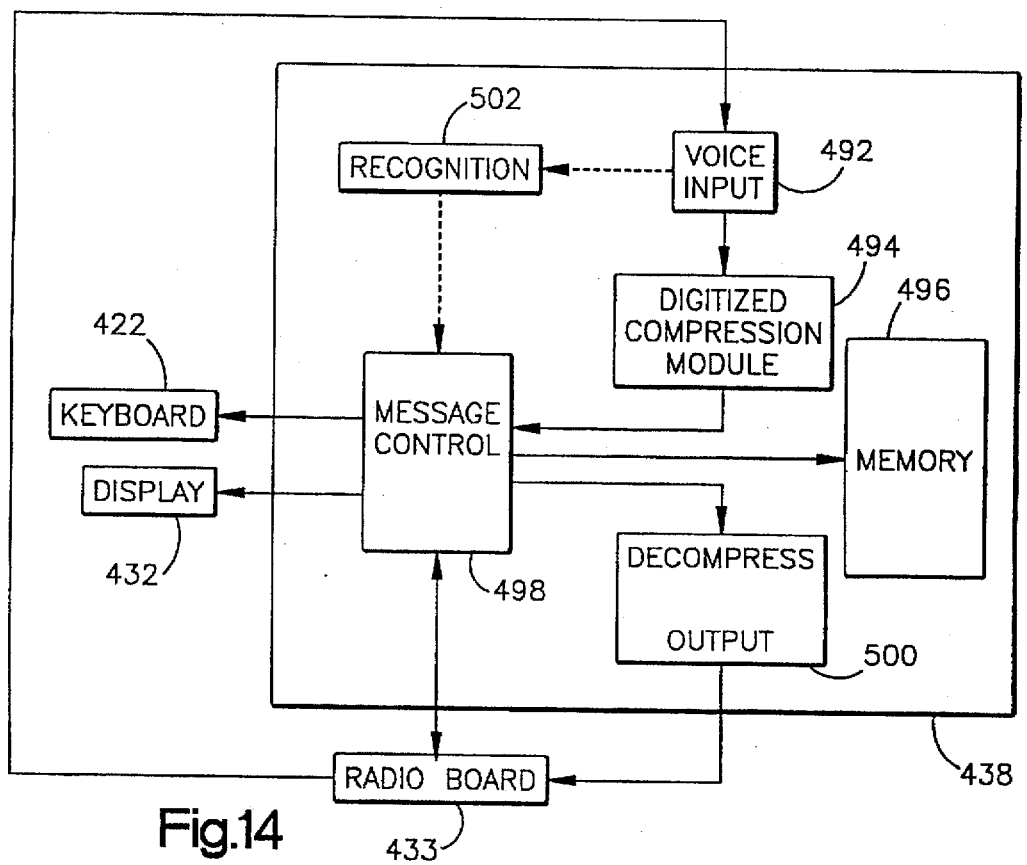
FIG. 14 is a block diagram of a voice mail system of the present invention.

Because the portable data collection system 400 of the present invention is intended for use at remote locations, an operator working at a remote location of the facility may need to request supervisory instructions while capturing and decoding dataforms. Therefore, the data collection system 400 of this invention may advantageously include voice mail circuitry 438 (FIG. 14) so that the operator may verbally communicate with others through the spread spectrum network. Referring to FIG. 14, a block diagram of the voice mail circuitry 438 is shown which may be embodied in a microprocessor system (not shown) or in a voice mail processing board 437 the main control board 431 (FIGS. 11 and 13). Turning to FIG. 14, a voice message is input through an audio input circuit 492 which can include an internal microphone or a port for connection to an external microphone which will be discussed in more detail later. A digitizer/compression module 494 will create a digital data file representative of the audio input.

Prior to transmitting the message, a message control unit 498 will prompt the operator to identify the addressee. The prompt may take the form of an audible signal to the operator through the audio output circuit 500 (discussed later), or a display screen message.

In a time window following the prompt, the operator must identify the addressee. This can be done through the keyboard 422 or the touch panel 444 (shown in FIGS. 10–13). Alternatively, the addressee may be identified by audio input. In this embodiment, voice recognition circuitry 502 will operate to convert the audio signal to a digital address.

The message control unit 498 will add the address to the message and relay the message to the spread spectrum transceiver for broadcast to the addressee. It should be appreciated that the voice mail system could require operator identification of the addressee before or after input of the message.

The message control unit 498 operates to receive data files representative of incoming voice mail messages and stores such messages in memory 496. Upon receipt of an incoming message, the control unit 498 notifies the operator of receipt through the audio output circuit 500, the display screen or a dedicated illuminator.

Upon an operator prompt to output the voice marl message, the control unit 498 will retrieve the data file from memory. A decompression module will convert the data file to an analog signal and audio output circuitry, which may include a speaker or a port for a remote speaker or headset will output the message. The operator prompt to output the message may be through the keyboard 422, the touch panel 444 or the audio input circuit 492.

After output of the message, the voice mail circuitry 438 may optionally store the message for later playback or erase the message. In conjunction with storage or erasure, the message may be forwarded or responded to. The voice mail circuitry 438 will prompt the operator to input the various permutations of these options. If the message is stored, the digital data file will remain in a memory 496. If forwarded, the data file, or a copy, will be appropriately addressed and transmitted to the spread spectrum radio board 433.

If the respond option is selected, the identity of the address of the response message is known and the message control unit 498 prompts the operator to input a response message. The digital data file representative thereof is sent by the spread spectrum radio board 433.

Figure 15:
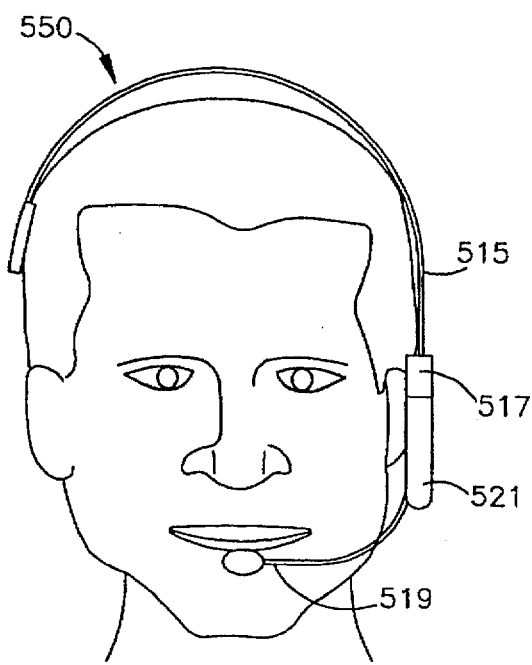
FIG. 15 is a front elevation view of a wireless headset system of the present invention.

Referring to FIG. 12, a speaker 450 and a microphone 452 are preferably positioned so that the portable data communication system 400 may be held along the side of the operator's face like a telephone set for communication. In another embodiment of the portable data collection system 400 illustrated in FIGS. 12 and 13. A wireless headset 550 is used in lieu of having the speaker 450 and the microphone 452 mounted in the homing 410. In the embodiment illustrated in FIG. 15, a speaker 517 and a microphone 519 are embodied in the wireless headset 550. The headset includes a headband 515 for holding the device on an operator's head. The speaker 517 is positioned near the operator's ear and the microphone 519 is positioned near the operator's mouth. A micro radio module and a power source are located in a housing 521 attached to the headset 500. Similarly, the system housing 410 would include a matching micro radio module (not shown) transcieving audio signals with the headset. The micro radio module operates on a narrow band modulation scheme wherein the band is aligned in a null of the frequency spectrum of the spread spectrum radio.

In addition to operating in conjunction with a wireless headset, the micro radio can function as a wireless peripheral port so that the operator may print a dataform label without physically connecting the data collection system to a printer. Printers or other peripheral devices with similar micro radio boards may be placed throughout the installation in which the data collection system is operated. When an operator approaches the peripheral device with the system, a hand shake sequence is initiated and a wireless link is established. Data may then be printed out on the peripheral device.

Because the data collection system 400 of this invention is intended for portable use it is desirable that the power supply or source 30 (FIGS. 11 & 13) provide for operation over an extended period of time without requiring recharging. Although the power source 30 could be any rechargeable cell, the preferable power source is a plurality of Lithium Polymer flexible battery cells. Each flexible sheet is about 0.002" (2 mils) thick and appears to be a sheet of plastic. To construct such a cell, $Li\ Mn_2\ O_4$ is used as the cathode and carbon as the anode. Such a cell is available from Bellcore of Red Bank, N.J.. One advantage of the lithium polymer cells is that the flexible sheet form factor is such that the cells may be folded and placed in areas of the housing which are of inadequate space for traditional cylindrical cells. In FIG. 13, the polymer sheet cells of the power source 30 are advantageously placed along the surface of the housing interior wherein the polymer cells also function to reduce unwanted EMS. In addition to the form factor and EMS advantages, the lithium polymer cells are rechargeable and provide about 3 times the energy density as the NiCad cells and do not suffer the NiCad crystallization that produces the degenerative memory effect.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. A dataform reader comprising:
   a) a board camera including a two dimensional photosensor array comprising a set of pixels and control circuitry for generating a video signal representative of an illumination content on each pixel in the set of pixels over an exposure period;
   b) the board camera control circuitry including a gain control signal input and an exposure period control signal input;
   c) an analog to digital converter coupled to the board camera, the analog to digital converter receiving the video signal and generating gray scale values; and
   d) a control unit coupled to the board camera and the analog to digital converter to receive the gray scale values and analyze a portion of the gray scale values, generate at the least one of a gain control signal input to the board camera control circuitry gain control signal input and an exposure period control signal input to the board camera control circuitry exposure period control signal input.

2. The two dimensional dataform reader of claim 1, wherein the control unit accesses one or more membership function charts stored in memory to analyze the portion of the gray scale values, each of the one or more membership function charts including a plurality of overlying functions wherein one function of the plurality of functions represents a normal condition for a magnitude of a gray scale value and at least one function represents a non-normal condition for the magnitude of a gray scale value.

3. A dataform reader comprising:
   a) a board camera including a two dimensional photosensor array comprising a set of pixels and control circuitry for generating a video signal representative of an illumination content on each pixel in the set of pixels over an exposure period;
   b) the board camera control circuitry including a gain control signal input and an exposure period control signal input;
   c) a fuzzy logic control unit coupled to the board camera to receive the video signal, capture and analyze a portion of the video signal and, based on the analysis of the captured portion of the video signal, generate at the least one of the gain control signal and the exposure period control signal; and
   d) the fuzzy logic control unit accessing one or more membership function charts stored in memory to analyze the video signal, each of the one or more membership function charts including a plurality of overlying functions wherein one function of the plurality of functions represents a normal condition for the captured portion of the video signal and at least one function representing a non-normal condition for the captured portion of the video signal;
   e) an A/D converter receiving the video signal and generating a series of gray scale values representative of illumination incident on each pixel in accordance with a reference signal; and
   f) the fuzzy logic control unit further generating a reference signal in response to the membership functions inputs.

4. The two dimensional dataform reader of claim 3, wherein the membership function charts include a histogram membership function chart representative of the quantity of pixels in an image area having a corresponding gray scale value in excess of a predetermined number.

5. The two dimensional dataform reader of claim 4, wherein the membership function charts further include at least one of:
   a) a dynamic range membership function chart representative of local maximum values in the video signal; and
   b) a dynamic range membership function chart representative of local minimum values in the video signal.

6. The two dimensional dataform reader of claim 5, further including an digital to analog converter circuitry convening digital gain control, exposure period control and reference voltage control signals from the fuzzy logic circuitry to analog voltage signals usable by the photosensor array and the A/D converter.

7. The two dimensional dataform reader of claim 5, wherein the fuzzy logic control unit includes a processor for calculating an index value as a function of values derived from the captured video signal and the membership function charts and a memory including a look-up table for selecting a gain control value, exposure period and reference voltage setting in accordance with the index value.

8. The two dimensional dataform reader of claim 7, wherein the index value is further a function of a previous index value calculated during a previous dataform reading session.

9. A method of imaging a dataform in a target area using a dataform reader including a two dimensional photosensor array, a control unit and an A/D converter, said method including:

a) imaging said target area including said dataform onto a two dimensional photosensor array comprising a set of pixels;

b) generating a video signal representative of an illumination content on each pixel in the set of pixels of the two dimensional photosensor array over an exposure period in accordance with a gain control input and an exposure period input;

c) converting a portion of the video signal to a set of gray scale values utilizing the A/D converter;

d) inputting the set of gray scale values to the control unit which utilizes a portion of the set of gray scale values to generate at least two membership function input values representing characteristics of said video signal; and e) applying a fuzzy logic control function to said membership function values utilizing the control unit to generate at least one of said gain control input and said exposure period input.

10. The method of claim 9, wherein said membership function input values include a dynamic range maximum value and a dynamic range minimum value and step (d) includes:

a) generating a dynamic range maximum value representative of local maximum values in the video signal; and b) generating a dynamic range minimum value representative of local minimum values in the video signal.

11. A method of reading a dataform in a target area, said method including:

a) imaging said target area including said dataform onto a two dimensional photosensor array;

b) generating a video signal representative of said image in accordance with a gain control input and an exposure period input;

c) generating a digital video signal from the video signal, the digital video signal including a sequence of gray scale values representative of said bar code in accordance with the difference between said video signal and a reference voltage;

d) generating at least two membership function input values representing characteristics of said video signal; and e) applying a fuzzy logic control function to said membership function values to generate at least one of said gain control input and said exposure period input.

12. The method of claim 11, wherein said membership functions input values include a histogram value and step (d) includes: a) generating a histogram value representative of the quantity of pixels in the image area with a gray scale value in excess of a predetermined number.

13. The method of claim 12, wherein said membership function inputs further include a dynamic range maximum value and a dynamic range minimum value and step (d) further includes:

a) generating a dynamic range maximum value representative of local maximum values in the video signal; and b) generating a dynamic range minimum value representative of local minimum values in the video signal.

14. The method of claim 11, wherein step (e) includes the following substeps:

a) generating an index number as a function of said membership function values; and b) applying the index number to a look-up table to determine said gain control input, the exposure period input and the reference voltage in accordance with the index number.

15. The method of claim 14, wherein the index number is further a function of a previous index number generated during a previous dataform reading session and step (e) of the method further includes:

a) storing said index value in a memory for use in a future dataform reading session.

16. A method of imaging a dataform in a target area, said method including:

a) imaging said target area including said dataform onto a two dimensional photosensor array;

b) selecting at least one of an exposure period value and gain control value in accordance with values selected during a previous dataform reading session;

c) generating a video signal representative of said dataform and in accordance with at least one of the exposure period value and gain control value;

d) generating a set of gray scale values corresponding to the video signal;

e) utilizing the set of gray scale values to generate at least two membership function input values representative of characteristics of said video signal;

f) applying a fuzzy logic control function to said membership function input values to determine at least one of an updated exposure period value and an updated gain control value; and g) storing a value representative of said updated exposure period and gain control values in memory for use in a subsequent dataform reading session.

17. The method of claim 16, wherein said membership function values include at least one of a dynamic range minimum value and step (e) includes:

a) generating a dynamic range maximum value representative of local maximum values in the video signal; and b) generating a dynamic range minimum value representative of local minimum values in the video signal.

18. The method of claim 16, wherein step (e) includes the sub-steps of:

a) generating an index number as a function of the membership function values and a previous index number generated during a previous imaging session; and b) applying the index number to a look-up table to determine the at least one of the updated exposure period value and the updated gain control value.

19. A low power consumption dataform reader for reading a dataform in a target area, the reader comprising:

a) an illumination source directing illumination towards the target area;

b) a board camera including a two dimensional photosensor array comprising a set of pixels which receive reflected illumination from the target area, the board camera further including camera control circuitry for generating a signal representative of accumulated illumination incident on each of said pixels during an exposure period; and c) illuminator control circuitry providing operating power to the illumination source during the exposure period when the exposure period is in excess of a predetermined duration and not providing operating power to the illumination source when the exposure period is less than or equal to the predetermined duration.

20. The dataform reader of claim 1 wherein the control unit further generates a reference signal input to the analog to digital converter, the reference signal being utilized by the analog to digital converter to generate gray scale values.

* * * * *